US012790742B2

(12) United States Patent
Hussey et al.

(10) Patent No.: US 12,790,742 B2
(45) Date of Patent: Nov. 10, 2026

(54) INSULATED RADIANT BARRIERS IN APPAREL

(71) Applicant: Xefco Pty Ltd, Lilyfield (AU)

(72) Inventors: Thomas Hussey, Lilyfield (AU); Brian Conolly, Lilyfield (AU); Scott Whitby, Lilyfield (AU)

(73) Assignee: XEFCO PTY LTD, Lilyfield (AU)

( * ) Notice: Subject to any disclaimer, the term of this patent is extended or adjusted under 35 U.S.C. 154(b) by 0 days.

(21) Appl. No.: 17/059,362

(22) PCT Filed: May 19, 2019

(86) PCT No.: PCT/AU2019/050484
§ 371 (c)(1),
(2) Date: Nov. 27, 2020

(87) PCT Pub. No.: WO2019/227131
PCT Pub. Date: Dec. 5, 2019

(65) Prior Publication Data

US 2021/0214886 A1 Jul. 15, 2021

(30) Foreign Application Priority Data

May 28, 2018 (AU) ................................ 2018901859
May 28, 2018 (AU) ................................ 2018901860
(Continued)

(51) Int. Cl.
*D06M 11/83* (2006.01)
*B32B 3/26* (2006.01)
(Continued)

(52) U.S. Cl.
CPC ............ *D06M 11/83* (2013.01); *B32B 3/263* (2013.01); *B32B 3/28* (2013.01); *B32B 3/30* (2013.01);
(Continued)

(58) Field of Classification Search
CPC ............ D06M 11/83; B32B 2307/724; B32B 3/263; B32B 3/266; B32B 3/288;
(Continued)

(56) References Cited

U.S. PATENT DOCUMENTS

2013/0212789 A1 8/2013 Conolly et al.
2014/0327957 A1 11/2014 Conolly et al.
2014/0356574 A1 12/2014 Conolly et al.

FOREIGN PATENT DOCUMENTS

WO 2013/025827 2/2013
WO 2017/009339 1/2017

OTHER PUBLICATIONS

International Search Report for PCT/AU2019/050484 mailed Jul. 15, 2019, 4 pages.
(Continued)

*Primary Examiner* — Zachary M Davis
(74) *Attorney, Agent, or Firm* — Nixon & Vanderhye P.C.

(57) ABSTRACT

A textile including a radiant barrier, the textile comprising a proximal side and a distal side. The textile also comprising a first substrate and a second substrate. The first substrate disposed distally of the second substrate. An insulation layer disposed adjacent to the second substrate; and wherein at least one of the first substrate and the second substrate is a radiant barrier, and wherein the radiant barrier has an average thickness of between 20 nm to 150 nm.

20 Claims, 15 Drawing Sheets

(30) Foreign Application Priority Data

| | | |
|---|---|---|
| Sep. 18, 2018 | (AU) | 2018903501 |
| Sep. 18, 2018 | (AU) | 2018903510 |
| Dec. 20, 2018 | (AU) | 2018904864 |
| Feb. 21, 2019 | (AU) | 2019900561 |

(51) Int. Cl.

| | |
|---|---|
| ***B32B 3/28*** | (2006.01) |
| ***B32B 3/30*** | (2006.01) |
| ***B32B 5/02*** | (2006.01) |
| ***B32B 5/26*** | (2006.01) |
| *A41D 31/06* | (2019.01) |
| *A41D 31/102* | (2019.01) |
| *A43B 7/34* | (2006.01) |

(52) U.S. Cl.

CPC .............. *B32B 5/022* (2013.01); *B32B 5/024* (2013.01); *B32B 5/26* (2013.01); *A41D 31/065* (2019.02); *A41D 31/102* (2019.02); *A43B 7/34* (2013.01); *B32B 2255/02* (2013.01); *B32B 2255/205* (2013.01); *B32B 2307/304* (2013.01); *B32B 2307/724* (2013.01); *B32B 2307/7265* (2013.01); *B32B 2437/00* (2013.01); *Y10T 428/24562* (2015.01); *Y10T 428/24661* (2015.01)

(58) Field of Classification Search

CPC ........... B32B 5/022; B32B 5/26; B32B 5/262; A41D 31/00; A41D 31/02; A41D 31/04; A41D 31/06; A41D 31/065

See application file for complete search history.

(56) References Cited

OTHER PUBLICATIONS

Written Opinion of the ISA for PCT/AU2019/050484 mailed Jul. 15, 2019, 4 pages.

INSULATED RADIANT BARRIERS IN APPAREL

This application is the U.S. national phase of International Application No. PCT/AU2019/050484 filed May 19, 2019 which designated the U.S. and claims priority to AU Patent Application No. 2018901859 filed May 28, 2018, AU Patent Application No. 2018901860 filed May 28, 2018, AU Patent Application No. 2018903501 filed Sep. 18, 2018, AU Patent Application No. 2018903510 filed Sep. 18, 2018, AU Patent Application No. 2018904864 filed Dec. 20, 2018, AU Patent Application No. 2019900561 filed Feb. 21, 2019, the entire contents of each of which are hereby incorporated by reference.

TECHNICAL FIELD

The present disclosure relates to fabrics made for apparel, sleeping bags tents, and the like, in various composites, constructed such that a combination of substrate layers and insulation layers is configured to provide improved thermal insulation.

BACKGROUND

Barriers against external environments have long been a necessity for people and structures. Protection from the cold and heat may provide for improved comfort and reduce the potential for heat to be transferred from one side of the barrier to the other. As such, radiant barriers may provide for improved insulation.

Commonly, radiant barriers are used in construction and building in combination with insulative layers and are used in walls, ceilings, floorings and windows. These barriers may reduce the potential for heat to pass from one side of the barrier to the other. Further, radiant barriers are also employed in a number of garments, blankets and textiles to retain heat or keep heat out, for example coats, sleeping bags and tents may use materials with radiant barriers.

Insulating materials used in clothing or other outdoor equipment known in the art typically use fibre-based insulations such as synthetic non-woven insulations, down insulations, wool insulation and fleeces. Low density fibre insulations particularly common due to their ability to contain a high volume of air in their structure, providing higher thermal insulation. This ability of low-density thermal insulations to contain a large number of air voids inside their structure providing high ratio of air volume to fibre volume provides a better thermal barrier against heat flow from the wearer's body to the environment than fleece fabric structures.

Heat transfer through low density fibre based insulations occurs in the form of conduction, convection and radiation. The characteristics of said insulations are therefore optimised to provide optimum insulation against heat loss via conduction, convection and radiation, however this generally causes insulation layers to be relatively thick, bulky or heavy weight which can increase production costs and also impact the environment from production or when disposed.

Whilst conventional fibre-based insulations can be combined with a radiant barrier to increase thermal resistance, this has a number of disadvantages and may result in the radiant barrier being overall less effective. For example, the addition of the radiant barrier may only provide a small increase in thermal resistance due to the already high insulating properties of the fibre insulation against radiation.

Common insulation barriers are formed with mono-filament fibres which are bonded together to form the insulation barrier. These mono-filaments can often become unbonded from adjacent fibres and can penetrate the outer facing surface of the textile. This leads to reduced loft, thereby decreasing the overall insulative properties of the insulation barrier and filaments protruding from a face textile are generally unsightly. Further, stray fibres can also damage the fluid resistant properties and breathability properties of a garment, and may cause skin irritations as fibres may feel scratchy or uncomfortable. These stray fibres may then be dislodged, and the polymeric fibre may be introduced to the environment which can then be ingested by wildlife.

As such, it may be desirable to create an insulating composite comprising at least one radiant barrier and an insulating material whereby the radiant barrier provides insulation against radiative heat loss more effectively. Further, it may be desirable to reduce the need for thicker or heavier insulation to reduce the amount of fibres required, fibre Any discussion of the prior art throughout the specification should in no way be considered as an admission that such prior art is widely known or forms part of common general knowledge in the field.

SUMMARY

Problems to be Solved

It may be advantageous to provide a textile or material which can provide a radiant barrier.

It may be advantageous to provide a textile or material which can reduce the thickness of a garment.

It may be advantageous to provide a textile or material which reduces emissivity.

It may be advantageous to provide for a textile or material which has a structure adapted to elevate a portion of the material above a surface.

It may be advantageous to provide for a textile or material which reduces infrared emissions.

It may be advantageous to provide for a textile or material which can be used to provide improved insulation.

It may be advantageous to provide for a textile or material which has a resilient structure.

It may be advantageous to provide for a textile or material which can be moulded to form a resiliently flexible structure or shape.

It may be advantageous to provide for a textile or material which can form space or gaps between a surface and portions of said material.

It may be advantageous to provide for a substrate which is flexible and metalised.

It may be advantageous to provide for a textile composites which weighs less than conventional fibre insulation layered textile composites, with respect to the same area coverage.

It may be advantageous to provide for a textile composites which is less thick than conventional fibre insulation layered textile composites, with respect to the same area coverage.

It may be advantageous to provide for a textile with at least one protective coating which may be corrosion resistant.

It is an object of the present invention to overcome or ameliorate at least one of the disadvantages of the prior art, or to provide a useful alternative.

Means for Solving the Problem

A first aspect of the present disclosure may relate to a textile including a radiant barrier. The textile may comprise a proximal side and a distal side. A first substrate and a second substrate disposed on the first substrate with the first substrate being disposed distally of the second substrate. An insulation layer disposed adjacent to the second substrate; and wherein at least one of the first substrate and the second substrate may be a radiant barrier, and wherein the radiant barrier has an average thickness of between 20 nm to 150 nm. In another embodiment, the radiant barrier has a thickness of between 3 nm to 20 nm.

Preferably, the insulation layer is in contact with less than 20% of the surface area of the second substrate. Preferably, the second substrate is the radiant barrier and the first substrate is a woven or non-woven material. Preferably, the second substrate covers between 60% to 100% of a surface of the first substrate. Preferably, at least one of the first substrate and the second substrate has a desired shape formed by at least one of; moulding, stamping, heat treatment, ultrasonic welding and embossing. Preferably, the insulation layer has a desired shape formed by at least one of; moulding, stamping, heat treatment, ultrasonic welding and embossing. Preferably, the desired shape is formed by at least one of a reinforcement structure and ribbing elements. Preferably, the insulation is formed with at least one of a thickness gradient and variable densities. Preferably, a third substrate is disposed proximally of the insulation layer. Preferably, the third substrate has a further radiant barrier disposed thereon, and the insulation layer is adjacent the further radiant barrier. Preferably, the distal side of the first substrate has a at least one of a radiant barrier and an insulation layer disposed thereon. Preferably, the insulation layer is in contact with less than 20% of the surface area of the second layer. Preferably, the thickness of the first substrate is at least 500 times greater than the thickness of the second substrate. Preferably, the second substrate is deposited on the first substrate by vapour deposition.

In another aspect of the present disclosure may relate to a textile comprising an inner substrate and an insulation layer disposed distally of the inner substrate. A radiant barrier disposed distally of the insulation layer. A further substrate disposed distally of the radiant barrier, in which the radiant barrier is fixed thereto. A coating on the distal side of the further substrate; and wherein preferably less than 20% of the radiant barrier is in contact with the insulation layer.

In yet another aspect, there may be provided a textile comprising a first substrate and a second substrate arranged proximally of the first substrate. The first substrate may be plastically deformed to impart a texture on said substrate and the second substrate being shaped to conform to the first substrate; and wherein first substrate and the second substrate may be coated with a protective coating, and the second substrate may be a metal substrate and the first substrate may be a flexible substrate, the first substrate being selected from the following group of; a woven material, a non-woven material, a knitted material, synthetic fibres, natural fibres, knitted fabrics, woven fabrics, non-woven fabrics, and composites thereof.

Preferably, the second substrate may be deposited on the first substrate by vapor deposition. Preferably, a membrane may be disposed between the first substrate and the second substrate.

In the context of the present invention, the words “comprise”, “comprising” and the like are to be construed in their inclusive, as opposed to their exclusive, sense, that is in the sense of “including, but not limited to”.

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Figure 1A:
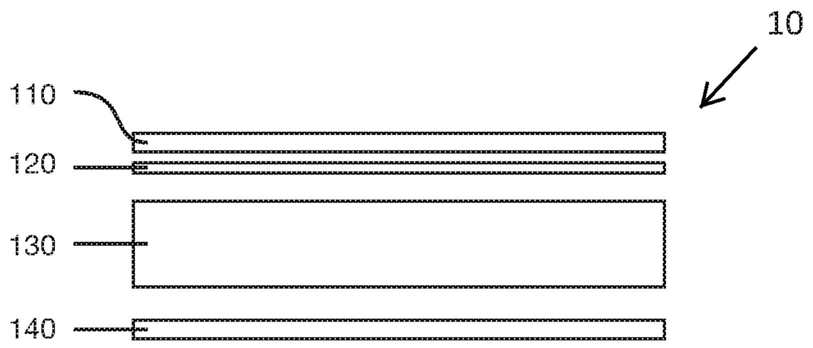
FIGS. 1A and 1B are schematic diagrams illustrating an embodiment composite materials including layering combinations of substrates, metal layers and insulating layers.

Preferred embodiments of the invention will now be described with reference to the accompanying drawings and non-limiting examples.

The present invention relates to textiles and fabrics, which may be primarily used for apparel and garments. The textiles 10 may be formed with at least one metal layer, forming a radiant barrier, with each layer of the textile 10 being a substrate of the textile. The radiant barrier can be used to prevent heat loss via radiation from the human body. The textile may also include at least one insulating layer, such as a fibre-based insulation material, to protect the metal layer and also reduce heat loss via conduction and convection. The metal layer may have variable thicknesses to allow for differentials in radiant barrier protection or for radiant reflection properties.

Preferably the radiant barrier acts as an insulation layer, and may provide a barrier against radiative heat loss, and the fibre-based insulation material provides insulation against heat loss via conduction and convection. The use of a radiant barrier may allow the fibre based insulating material to be constructed at a much lower density and/or thickness than conventional insulations thereby creating a significantly thinner and lighter composite of equivalent thermal resistance while optionally providing improved compression resistance and durability. Further reducing the thickness of the insulation layer or using more coarse fibres may increase the number of washes a garment formed with the textile may be subjected to before a significant decrease in loft of the insulation, or more generally the warmth provided by the garment.

In an embodiment, the textile 10 is an insulating composite that has reduced weight and thickness compared to conventional fibre insulation layered systems commonly used in clothing, apparel or garments, herein collectively referred to as "garments". Said insulating composite comprises an insulating material and at least one radiant barrier or the composite comprises a substrate and metal layer. Preferably, the radiant barrier is a metal layer such as aluminium, silver, gold, or any metal layer which has a high luster (lustre) generally in the range of submetallic lustre to adamantine lustre. The insulating composite is configured such that insulating material provides insulation against conductive and convective heat loss and the radiant barrier provides insulation against radiative heat loss or other predetermined radiation depending on the metal/material selected for the radiant barrier.

In another embodiment, the metal layer is adjacent to at least one fibre-based insulation layer. The insulation layer is configured to provide insulation against thermal conduction and convection, said radiant barrier is configured to provide insulation against infrared radiation. It will be appreciated that the radiant barrier may be suitable for masking or insulating the infrared range primarily radiated by a human body or other similar radiant source, which is dominant in the 12 micrometre wavelength and typically in the infrared spectrum between 7 micrometre and 14 micrometres. It will be appreciated that other spectrum wavelengths may be masked or insulated depending on the desired application. Masking an infrared range may be related to the radiant barrier material, the fibre-based insulation a face layer of the textile 10, the thickness of the textile or part thereof, or may be provided by the composite textile as a whole. For example, the radiant barrier may provide infrared masking or insulation, and the face textile may be suitable for masking, insulating or dampening UV radiation. The textile may also include other barriers, such as chemical barriers which may repel water or other fluids or may be radiation resistant similar to a HazMat suit.

In yet another embodiment, the metal layer is applied to a woven, stretch woven, knitted or non-woven substrate, in which the metal layer has been produced via the process of vapour deposition. The vapour deposition may be applied in a vacuum to produce a uniform metal layer, or a layer substantially free of contaminants. In another embodiment, said metal layer is applied to a moisture vapour permeable substrate formed of a film, textile, or textile and film composite. In other embodiments, the metal layer is applied to a moisture vapour permeable and substantially liquid impermeable substrate formed of a film, textile, or textile and film composite. It will be appreciated that the metal layer may also be referred to herein as a "metal substrate" and/or a "radiant barrier".

While reference has been made to a metal layer being a radiant barrier for the textile, other materials may be suitable for use as a radiant barrier. For example, the following radiant barriers may be used; polymer films, coatings (comprising metal filings, metal flakes, ground metal, metal dust or any other desired metal structure), ceramic beads, sodium borosilicate, alumina, beryllia, magnesia, yttria and spinal. It will be appreciated a radiant barrier for a textile is preferably flexible when the radiant barrier has a thickness of between 0.01 nm to 100 μm. Coatings, films and/or non-metallic radiant barriers may optionally be applied by a vacuum glazing process.

Polymer films with low emissivity, preferably less than 0.3 may be used with the textile. Optionally, materials with a higher emissivity may be used to supplement a lower emissivity layer and may be used to protect a lower emissivity layer. Liquid coatings may also be used to provide a radiant barrier. Powdered, ground or flaked metals may be used in a mixture or solution which can be applied to a substrate to form a radiant barrier, or part thereof. The mixture or solution may be a coating which may include an inorganic phosphate binder which is then set, dried or hardened during the manufacture process to form a radiant barrier or portion thereof.

Films consist mainly of several layers of metalised polymers containing an adhesive which can be applied to a substrate. The several layers of metalised polymers may also include layers of ceramics and/or polymers, and/or polymer films. Such films may provide a tint to the textile colour, but may generally hide the radiant barrier from clear view, the tint may also transmitted light penetrating the radiant barrier. Hiding the radiant barrier may have the added benefit of making a textile appear to have fewer layers and therefore may be more desirable for particular garments.

High-rate magnetron sputtering of conductive radiant barriers can also be applied to a substrate. Sputtering may be used to apply radiant barrier layers of between 1 nm to 200 nm, but more preferably a layer between 10 nm to 50 nm can be applied with conventional sputtering processes. Materials which may be used with a sputtering process may include; aluminium, copper, gold, silver, carbon (such as diamond-like carbons or tetrahedral amorphous carbons), cadmium, zinc, indium, tin, titanium, bismuth, zirconium, zirconia, any combination of materials aforementioned or any of their alloys and/or oxides. Preferably, the radiant barrier may be protected by optically transparent dielectric layers, or any other abrasion resistant layer or layer which may reduce or prevent oxidation.

Radiant barriers may also include semiconductors, metal oxides and/or black pigment. Binders for such radiant barriers may include olefin based polymers, acrylics, and urethanes. Semiconductor coatings may be applied by CVD or PVD processes and said coatings may be doped with at least material elected from the following group: cadmium, zinc, indium, tin, copper, titanium, bismuth, gold, silver, zirconium, zirconia, any combination of materials aforementioned or any of their alloys and/or oxides. Optionally, such coatings may be used to protect a low emissivity layer from mechanical damage, such as an aluminium layer. Coatings applied to a substrate can be set using heat, or can be set using a catalyst, or can be set using a plasma treatment.

Tin oxides may have particular utility for use as a radiant barrier or may be used in combination with a metal layer or a radiant barrier. Tin oxides may be applied using CVD processes and offer a high transparency for visible light and provide a high reflectance for infrared light (or infrared radiation).

Aluminium layers or radiant barrier layers may be applied using PVD, or PEPVD methods. In addition, protective coatings may be applied to the radiant barriers and substrates which the radiant barriers are disposed on. The protective coatings may be applied by functional chemical coatings, or may be formed by oxidation of an applied layer which can protect adjacent coatings or layers. For example, a controlled volume of oxygen may be introduced at the time of radiant barrier application which can cause a controlled oxidation layer to be formed adjacent the radiant barrier. If aluminium is used as the radiant barrier, the protective coating may be an $AlO_x$ coating.

In a further embodiment, the textile 10 is constructed such that there is a first substrate and first insulation substrate adjacent to the first surface of said first substrate and a second substrate adjacent to the opposite side (other side) of the insulation substrate. More simply the insulation substrate is disposed between the first and second substrates. As substrates are generally planar, they may be considered to be a sheet of material and therefore have two sides; a proximal side and a distal side. A radiant barrier or metal layer may be provided on a single surface or both of the surfaces of each of the first and second substrates adjacent to said insulation substrate. It will be appreciated that the metal layer or radiant barrier may be bonded with a respective first substrate or second substrate and the insulation substrate may or may not be bonded to another substrate. In another embodiment, the insulation substrate is stitched, sewn, tacked, pinned, or otherwise selectively attached to at least one of the first substrate, the second substrate and/or the metal layer (or radiant barrier) on the first and/or second substrates.

In a further embodiment, additional organic and inorganic coating layers may be deposited before and/or after said metal layer is applied to a substrate in order to improve adhesion to said substrate and/or prevent corrosion, abrasion and/or achieve a lower emissivity by creating a smoother reflective surface. Shining techniques may be used to increase the reflectiveness of the radiant barrier after deposition or after bonding resulting in a relatively higher reflectance and therefore provide improved reflectance of thermal radiation. Optionally, the metal layer can have increased corrosion resistance and/or abrasion resistance by oxidising the surface of a metal coating. This may be achieved by using a plasma comprising oxygen, or by introducing an oxygen at the contact interface of the substrate and the metal layer during the time of deposition to form a self-protective metal oxide layer. For example, if an aluminium metal is to be deposited onto the substrate, the oxide layer will be an aluminium oxide ($AlO_x$). $AlO_x$ can provide for a superior bond relative to pure aluminium and may allow for improved adhesion or bonding of metal layers, functional coatings, protective coatings and/or bonding to substrates or layers of the composite textile 10.

Functionalisation of the various coatings can also be optionally included, and alternative embodiments of the present invention may also have extra material layers (substrates) in the composite. Any layer or substrate may be functionalised to be flame retardant, UV absorbing, self-cleaning, hydrophobic, hydrophilic, and/or antibacterial.

In another preferred embodiment, a metal layer may be produced by means of coating the substrate with a thin metallic film by means of sputtering, rotary screen printing, block screen printing, transfer printing, jet printing, spraying, sculptured roller or other methods. In an alternative embodiment, said metal layer is applied to said substrate by means of transfer metallisation whereby a thin metal film or foil is coated onto a release substrate via vacuum vapour deposition or other method and then adhered onto said substrate. As used herein, the term "metal" includes any elemental metals and their alloys.

Referring to FIG. 1A, there is illustrated an embodiment of a textile composite 10, the textile composite has a substrate 110 with a metal layer 120, insulation layer 130 adjacent to said metal layer and additional substrate 140 adjacent to the opposing surface of insulating layer. The metal layer 120 may be bonded with the first substrate 110 and the insulation layer 130 may form an abutting relationship with the metal layer 120. Substrate 110 and additional substrate 140 may be formed from substantially the same material. Alternatively, substrate 110 may be pre-treated with a chemical or functional treatment to provide water resistance or abrasion resistance prior to the application of the metal layer, or post treated with a chemical or functional treatment after application of a metal layer. The chemical or functional treatment may be a protective coating which can provide abrasion resistance and/or water repellency to the substrate and/or the metal layer. Maintaining the integrity of the metal layer may improve the lifespan of a garment formed from the textile 10. While the insulation layer is shown as a generally linear substrate, however any predetermined substrate shape may be used. The surface contact area between the insulation layer and the metal layer is preferably around 5% surface contact area to 60% surface contact area. In other embodiments the surface contact area may be up to 100%. However, it will be appreciated that fibre insulation materials of the insulation layer may have voids or gaps in the structure and therefore fibre contact area between the metal layer and the fibres of the insulation layer may be less than the surface contact area. As such, an actual contact area is the total contact surface area multiplied by the fibre contact area. The density of the fibres, spacing of the fibres, and thickness of the fibres may all be relevant to the fibre contact area. This is to say that while 50% of the surface contact area of the insulation layer may be in contact with an adjacent layer, such as a metal layer, the voids in the insulation layer may result in approximately 0.1% of the metal layer surface area being in direct contact with fibres of the insulation layer. For example, if there is a 5% contact between the metal layer and the insulation layer, there is 95% of the surface area not in contact with the insulation layer. However, if the voids of the insulation layer are 80% across the surface (therefore 20% fibre contact area in said 5% surface contact area), then the actual contact area between the fibres of the insulation relative to the metal layer will be 1% (5%*0.20=1%). Therefore, the fibre spacing is preferably within a predetermined range such that the actual contact surface area can be calculated. It will therefore be appreciated that a radiant barrier may be impacted by the surface smoothness or surface texture of an insulation layer, as such an insulation layer surface may be formed with predetermined void arrangements or a predetermined shape or porosity to achieve a desired actual contact area in a desired range. The areas of the metal layer not in contact with the insulation layer will have a higher reflectance as heat radiation will not be absorbed by the insulation before being reflected and therefore improve radiant barrier protection. As such, it is desirable to form the insulation material with a high porosity or a high void space as this may improve the reflectance of the radiant barrier.

Figure 4A:
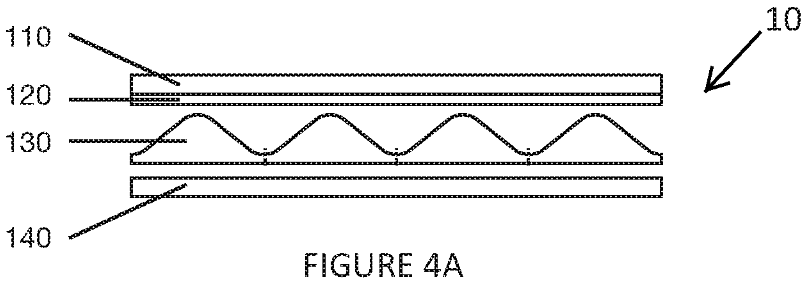
FIG. 4A shows another embodiment of a barrier with an insulation layer with cavities.

It will be appreciated that there are instances where the insulation layer is to be formed with a higher density to maintain a desired shape or to support an adjacent layer or substrate. For example, the insulation layer as illustrated in FIG. 4A may be formed from a high-density material (such as a closed cell foam) such that there are substantially no voids within the insulation layer and therefore the contact surface area of the insulation layer is also the actual contact surface area. In an embodiment, the fibres of the fibre insulation layer may have a thickness in the range of 10 micron to 50 micron and the fibres may be hollow core fibres. However, it may be advantageous in other embodiments to provide for a fibre with a solid core to increase the density of the fibres and also the resilience of the insulation layer. It will also be appreciated that the actual contact area of the insulation layer and the metal layer may change during wear as portions of the textile 10 will be compressed or stressed causing the deformation of the textile used in a garment. Therefore, the textile 10 may further comprise a spacer which may limit the changes in actual contact surface area between the insulation layer and the metal layer or a spacer may be used instead of an insulation layer.

As each substrate is generally planar, each substrate of the textile has a first side (first surface) and at least a second side (second surface). The first side of the substrate facing in a direction which is opposed to the second side of the substrate. In the embodiments illustrated in FIGS. 1A and 1B, substrate 110 is the most distal layer and substrate 140 is the most proximal layer, and reference may be made to these directions.

The position of the metal layer relative to a thermal energy source may impact the insulative properties of the textile 10. For example, it will be appreciated that having a metal layer between an insulation layer and a radiant energy source may have a lower temperature gradient relative to a metal layer disposed between a face substrate (such as substrate 110 as shown in FIG. 1A) and an insulation layer 130. The face substrate will typically be the substrate positioned most distal. This is due to the radiant barrier having a side near to an ambient temperature source (such as the environment) and a radiant and/or thermal energy source (when being worn), therefore the side of the metal layer closer to the ambient temperature source is likely to be substantially colder than the side closer to the radiant/thermal energy source. As such, this has a potential to cause condensation to form on the metal layer. As such, a hydrophilic membrane or coating may be used to remove/wick away said condensation.

In another embodiment, the metal layer 120 is disposed on substrate 140 such that the metal layer is proximal the insulation layer 130, and therefore metal layer 120 is between the insulation layer 130 and the substrate 140. Having the metal layer disposed between the insulation layer 130 and the substrate 140 may reduce the potential for condensation to form on the metal layer 120, which is particularly of use when using the textile 10 in cold weather gear or winter garments. Condensation may be reduced or eliminated as the temperature differential or temperature gradient between the proximal side and the distal side is smaller. As a non-limiting example, the textile may be adapted to have a temperature gradient in the range of 0 to 15 degree Celsius (a relative difference in temperature between the side of the metal layer) without condensation forming Therefore, a hydrophilic membrane or coating may not be required near to the metal layer, or the garment is less likely to get wet from condensation and keep the wearer warmer. As the textile 10 may have significant utility for winter sporting wear or winter wear. Further, as a low emissivity surface reflects and does not emit radiation, heat generated from a wearer may be prevented from radiating and thereby keeping a wearer warmer. While having a low emissivity layer (such as the metal layer) near to a source of heat, it will be appreciated that there is a barrier preventing the low emissivity layer from contacting the source of heat so as not to act as a conductor. In another embodiment, the low emissivity layer (such as a metal layer) may be desirably in contact with a wearer to cool a wearer. Such an arrangement may have beneficial use for summer or warm weather wear as the metal layer may conduct heat away from a radiant energy source keeping the wearer cooler.

Figure 1B:
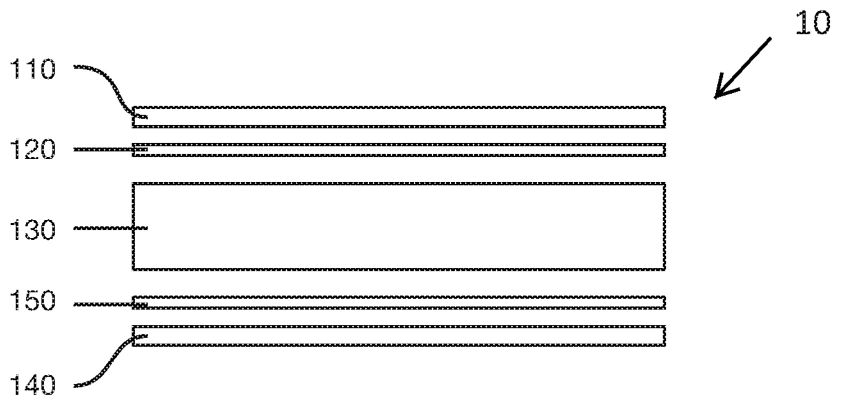

In another embodiment shown in FIG. 1B, a second metal layer 150 is disposed on substrate 140. As such, the insulation layer is bound between two radiant barriers or two metal layers. The metal layers may be the same material or may be different materials for different applications. For example, metal layer 120 may be formed from a higher density material to absorb radiation (photons) external the garment, and metal layer 150 may be a radiant barrier with a generally lower density. In addition, only one of the metal layers may be shined or have a higher lustre to improve radiant barrier protection. Optionally, metal layer 120 has a higher reflectance and/or lower emissivity than metal layer 150 such that thermal energy is more likely to pass through metal layer 150 and be substantially retained, at least temporarily, between metal layers 150 and 120. This may cause increased warmth of the wearer of a garment formed with the textile 10. Alternatively, metal layer 150 has a lower emissivity and higher reflectance relative to metal layer 120. Preferably, the insulation layer is not bonded to the metal layers. However, it will be appreciated that the insulation layer may be bonded to at least one of the metal layers to reduce the actual contact area between the metal layers and the insulation. Bonding the insulation to the metal layer(s) may be achieved by adhesive, ultrasonic welding, gluing, sewing, pinning, stitching or may be fixed while the metal layer is drying. It preferred that bonding of the layers of the textile 10 is a chemical bonding to improve bond strength and also reduce production time and textile thicknesses by avoiding the use of an adhesive. Chemical bonding may also provide for a more preferred flexibility or drapability of a textile used for a garment relative to a textile with an adhesive layer.

Figure 1C:
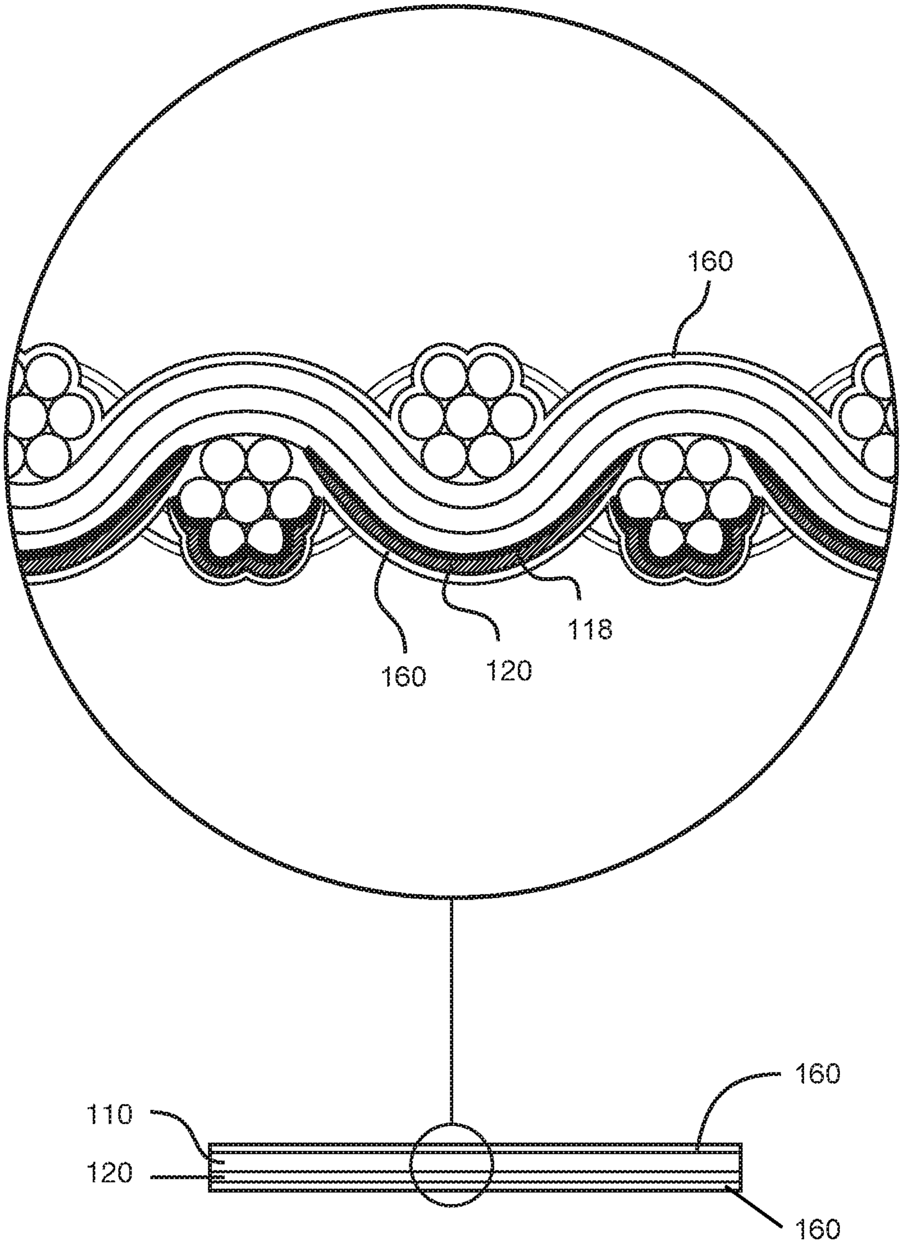
FIG. 1C illustrates an embodiment of a substrate with a close-up view of a portion of said substrate.

FIG. 1C shows a cross-sectional view of an embodiment of a woven substrate 110 after application of a protective coating layer 160 on a metal layer 120 and the distal surface of the substrate 110. The protective layer 160 can be a coating applied to both warp 114 and weft 112 yarns of textile 110 and coat the metal layer 120. The substrate 110 may be a porous moisture vapour permeable web membrane. The membrane may comprise nano-fibres with a diameter of less than 200 nm or even less than 150 nm Optionally, the nano-fibre web membrane is combined with at least one woven, non-woven or knitted textile. Other conventional membranes known in the art, such as PU, PTFE, PP, PE and other membranes may be used instead of nano-fibre web membranes.

A primer layer 118 has been applied to the substrate 110 in advance of the application of metal layer 120. A protective coating or protective layer 160 has been applied to both the proximal side of the metal layer, and the distal side of the substrate 110. The protective layer 160 may be disposed on the metal layer 120 and/or the substrate 110. Said protective layer 160 is preferably formed from an organic or inorganic compound that substantially coats the metal layer 120 and at least a portion of the yarns and/or fibres of the substrate 110. It may be preferred that the protective layer 160 covers a portion of the yarns and/or fibres without bridging gaps between adjacent yarns and/or fibres, and thereby at least partially covering the metal layer 120 and substrate yarns and/or fibres and maintain the porosity and air permeability of the substrate 110. In another embodiment, said protective layer 160 may coat only a portion of the surface of the substrate 110 and metal layer 120.

Figure 1D:
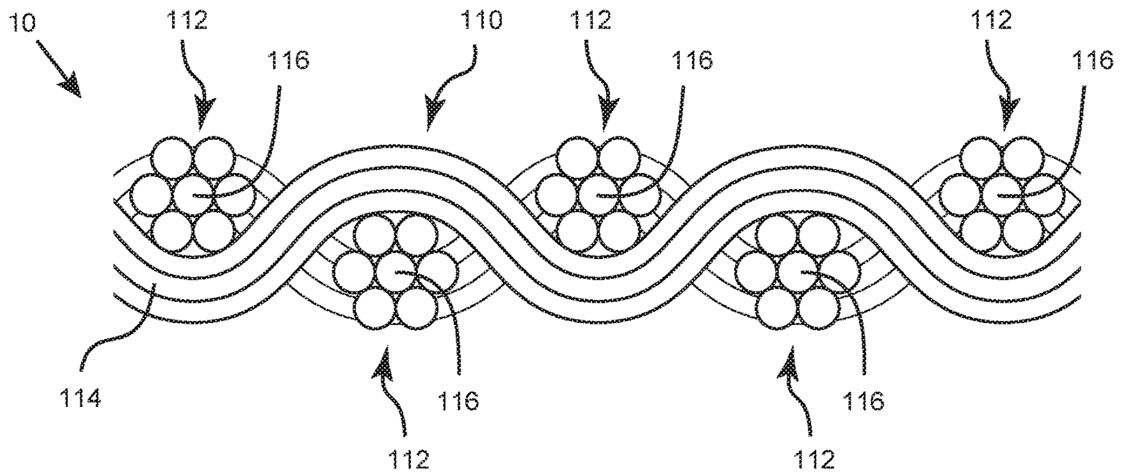
FIG. 1D to 1F illustrates an embodiment a substrate with layers being applied thereto to form a composite textile.
Figure 1E:
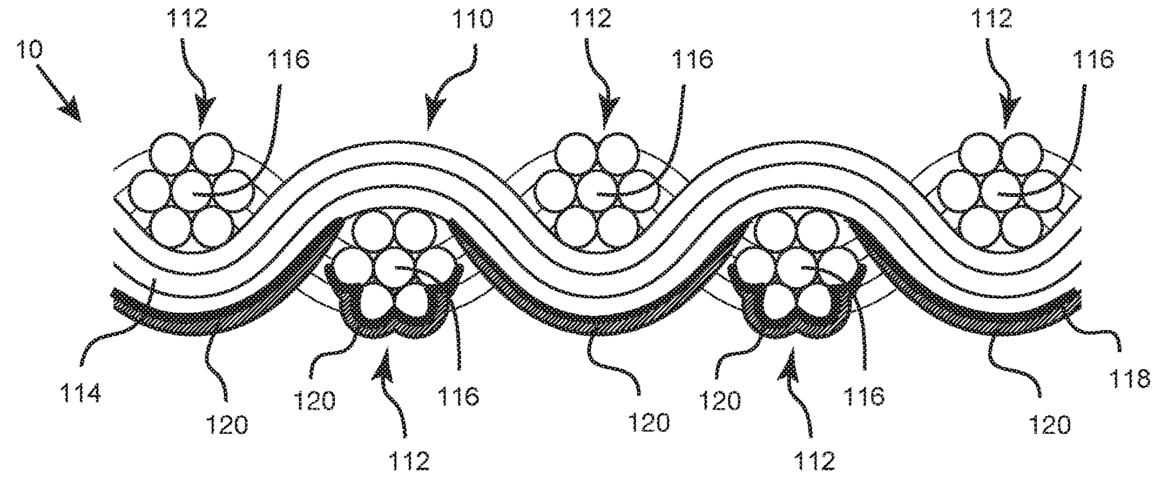

FIG. 1D shows a cross sectional view of an example woven textile substrate 110 with warp yarn 114 containing filaments 116 woven with weft yarn 112 with filaments 116. FIG. 1E shows a cross-sectional view of woven textile 110 following the deposition of primer layer 118 and a subsequent metal layer 120 to a surface of the substrate 110. The depositions of the primer 118 and the metal layer 120 has resulted in coating the exposed filaments of the warp yarn and weft yarn 112. It will be appreciated that depending on the tension and pressures within the deposition chamber, other filaments 116 which are not exposed may also be partly coated. The primer 118 may also be applied to the substrate by using wet coating methods or other common application methods in the art instead of being applied by deposition processes.

Figure 1F:
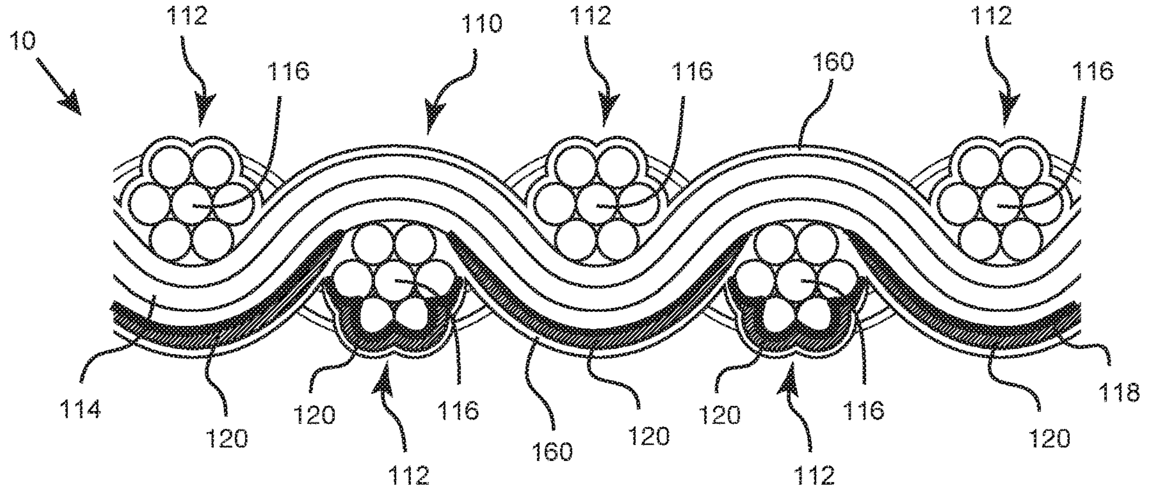

FIG. 1F illustrates an embodiment of a substrate 110 which has been coated with a protective layer 160. It will be appreciated that the protective layer 160 may be a film, heat shrink material or a liquid coating applied to at least one of the metal layer and the substrate. It is illustrated that both the substrate distal surface and the metal layer have been coated with a protective coating 160, however, it will be appreciated that only one surface may be coated or covered if desired.

It is preferred that the metal layers of the textile 10 are durable and abrasion resistant during normal use and also resistant to corrosion. Corrosion may be initiated by human perspiration, moisture, salt water and also acid and/or alkaline washing detergents, or by exposing the surface of the metal layer to oxygen. Durability and corrosion resistance of the metal layers may be improved by applying at least one protective layer 160 to a metal layer. As can be seen, protective layers 160 may generally conform to the shape of the warp and weft yarns of the substrate 110, and are generally uniformly distributed long the metal layer 120.

The protective layer 160 may be a functionalised layer, such as hydrophobic and/or oleophobic functionalisation, which may prevent corrosion or abrasion of the metal layer 120. Optionally, protective coating layers may be functionalised to be at least one of; flame retardant, UV absorbing, self-cleaning, oligodynamic, or antibacterial functionalisation.

Coating the substrate with a thin metallic film by means of sputtering, rotary screen printing, block screen printing, transfer printing, jet printing, spraying, sculptured roller or other methods. In another embodiment, said metal layer 120 is applied to substrate 110 by means of transfer metallisation whereby a thin metal film or foil is coated onto a release substrate via vacuum vapour deposition or other method and then adhered onto the substrate 110.

A primer coating layer 118 may be applied in advance of the application of a metal layer 120 and/or the protective layer 160 which may improve adhesion of the metal layer 160 and/or protective layer 160. Optionally, substrate 110, 140, 240, 270 further comprises a moisture vapour permeable non-woven textile, woven textile, stretch woven textile, knitted textile, nano-fibre web membrane, common membranes used in the art, or composites thereof and may be comprised of natural or synthetic fibres or filaments including nylon, polyester, spandex, polyurethane, polypropylene, cotton, wool, or other material or composite thereof.

The substrate 110 may be a woven substrate constructed from nylon or polyester warp yarns of around 5 to 20 denier at a density of around 150 to 250 threads per inch and weft yarns of around 5 to 20 denier at a density of around 150 to 250 threads per inch, said fabric is calendared at least one time and has air permeability of between 0.5 to 2 CFM. Alternatively, the substrate 110 may be a knitted fabric constructed from yarns between 10 and 100 denier using conventional circular knitting, warp knitting or weft knitting methods. Further, non-woven fabrics may be used to form the substrate 110. The substrate 110 has a thickness of between 20 to 200 micrometres and be between 5 to 50 grams per square meter ($gm^2$).

A primer 118 can be applied to the substrate 110 in advance of deposition of a metal layer 120. The primer 118 may assist with reducing outgassing at the time of deposition and may also be used to improve the adhesion of the metal layer to the substrate. A primer layer 118 is formed of an organic or inorganic compound is applied to the substrate fibres or yarn without bridging the gaps between adjacent fibres or yarns prior to the coating of the metal layer to improve the adhesion of the metal layer 120 to the substrate 110.

Vacuum vapour deposition methods may be used to apply at least one of a metal layer 120, primer 118 and protective coating layers 160. The thickness of the metal layer, primer 118 and/or protective layer 160 preferably provide the composite an emissivity no greater about 0.35 and preferably below 0.15. The primer 118 and protective layers 160 preferably have a thickness between about 5 nm and 500 nm.

The primer 118, metal and protective coating layers 160 do not bridge the gaps between adjacent warp and weft yarns except from where said yarns are connecting. This allows the composite to remain the original air permeability and drape of the original substrate prior to coating and also provides optimised water repellency and protection to the metal layer by preventing moisture from absorbing into yarns and/or filaments and/or fibres of the substrate.

Generally, the metal thickness is preferably minimised to reduce the amount of metal consumed during production, while also providing the desired thermal barrier properties. When the composite textile 10 is used in a garment the metal layers of the textile 10 reflect infrared radiation providing a radiant thermal barrier that reduces energy loss and keeps the person wearing the garment warmer.

The protective layer 160 may provide protection to the metal layer 120 from abrasion and/or corrosion. In at least one embodiment, the protective coating 160 is applied to the metal layer 120 in advance of oxidation occurring due to the exposure of said metal layer to atmosphere. Suitable metal coating layers which may be coated with a protective coating 160 to provide sufficient heat reflectivity may include; aluminium, copper, silver and other metals which are not durable with exposure to regular washing procedures commonly used for garments. In particular acidic and/or alkaline conditions during washing can corrode the metal layers 120, 150, 220, 250 during regular washing cycles.

Primer 118 and protective layers 160 may be formed from an organic or in-organic material and may be applied by at least one of; physical vapour deposition (PVD), chemical vapour deposition (CVD), plasma enhanced physical vapour deposition (PEPVD), plasma enhanced chemical vapour deposition (PECVD), plasma polymerisation, glow discharge deposition or other vapour deposition or vacuum vapour deposition techniques known in the art. In other embodiments, the primer 118 or protective layers 160 may be applied by knife coating, dipping, padding, spray coating or other methods. These methods may increase the overall thickness of primer 118 and/or protective layers 160 relative to vapour deposition methods. In some embodiments where the substrate 110 is a material with a normal or natural moisture content above 2% this encapsulation can be used to improve the efficiency of the deposition of the metal layers whereby the primer 118 coating layer reduces moisture outgassing during the deposition process.

Organic coating materials may comprise acrylate and/or methacrylate polymer or oligomer. Vacuum compatible oligomers or low molecular weight polymers include diacrylates, triacrylates and higher molecular weight acrylates functionalised as described above, aliphatic, alicyclic or aromatic oligomers or polymers and fluorinated acrylate oligomers or polymers. Fluorinated acrylates, which exhibit very low intermolecular interactions, useful in this invention can have weight average molecular weights up to approximately 6000 g/mol. Preferred acrylates have at least one double bond, and more preferably at least two double bonds within the molecule, to provide high-speed polymerisation. Examples of acrylates are described in U.S. Pat. No. 6,083,628 and WO 98/18852, however other acrylates may be used.

Inorganic coating materials to form the protective coating 160 may comprise silicon, silicon oxides, organosilanes and metal alkoxides such as titanium, tungsten, zinc. Inorganic coating materials may be deposited via at least one of PVD, CVD, PEPVD, PECVD, or other predetermined deposition techniques known in the art. Inorganic materials used for the protective coating layer are preferably transparent to infrared radiant and can include Barium Fluoride, Potassium Bromide, Caesium Iodide, Potassium Chloride, Cadmium Telluride, Sapphire, Calcium Fluoride, Gallium Arsenide, Germanium, Thallium Bromoiodide, Zinc Selenide and Zinc Sulfide. Inorganic coating layers can also be made by the sol-gel process of depositing a partially reacted metal alkoxide onto the substrate 110 in the presence of water and an alcohol. The layer 160 can also be produced from the deposition of a metal chloride solution.

Any protective coatings 160 applied may be hydrophobic and/or oleophobic. Hydrophobicity and oleophobicity may be achieved by inclusion of a monomer and/or sol-gel containing fluorinated functional groups and/or monomers that create a nanostructure on the metal layer 120 surface or substrate 110 surface. The hydrophobic surface may prevent or reduce contact of the alkaline, acidic or corrosion agents with the metal layer.

In a preferred embodiment, the application of hydrophobic coatings on said substrate 110 can also be used to provide a high level of water repellency to the substrate 110 whilst maintaining its moisture vapour permeability. If the substrate can be formed from a nano-fibre web membrane or composite thereof, hydrophobic and/or oleophobic layers may be configured to create a liquid impermeable and moisture vapour permeable substrate whereby the hydrophobic and/or oleophobic coating on said nano-fibres prevent or limit the movement of liquid water through the membrane, even under high pressure.

Antimicrobial coatings from a monomer and/or sol-gels with antimicrobial functional groups and/or antimicrobial agents, these may include chlorinated aromatic compounds and naturally occurring antimicrobials. Said antimicrobial agents can preferably be encapsulated antimicrobial agents. Fire retardant coatings from monomers and/or sol-gels with a brominated functional group. Self-cleaning coatings from monomers and/or sol gels that have photo-catalytically active chemicals present, these coatings may comprise at least one of a; zinc oxide, titanium dioxide, tungsten dioxide and other metal oxides). Ultraviolet protective coating from monomers and/or sol-gels that contain UV absorbing agents.

Primer layer 118 may be a primer formed with chromium layer deposited on the substrate 110 in advance of deposition of the metal layer 120 said aluminium layer a chromium layer that is deposited on the aluminium layer following deposition of the aluminium layer or other metal layer. The metal layer can have increased corrosion resistance and/or abrasion resistance by oxidising the surface of a metal coating with an oxygen-containing plasma to form a self-protective metal oxide coating. In another embodiment, $AlO_x$ primers and/or $AlO_x$ protective coatings can be used to protect metal layers or improve adhesion of metal layers to a substrate or layer. $AlO_x$ can also be used to improve adhesion of a further functional coating, such as a hydrophobic coating. Oxidation of aluminium or another metal vapour can occur at the time of deposition by introduction of an oxygen species at the interface between the substrate and the metal layer. This may provide a more efficient method for manufacture of metalised substrates, as protective coatings and deposition of a radiant barrier metal layer can be achieved during the same process, and almost at the same time of processing.

Protective layer 160 is formed by the reaction of chemical conversion materials with the surface of the metal layer. Said conversion coating materials may include chromate-based conversion coatings and non-chromate conversion coatings.

Substrate 110 is preferably degassed to reduce the overall water and/or solvent content before application of the primer 118 and/or metal layer 120. Degassing may be achieved via vacuum vapour deposition. Optionally, the primer 118 may also be required to be degassed in advance of the deposition of the metal layer. Substrate can be outgassed by winding the fabric from a first roller to a second roller within a vacuum chamber at least one time. Outgassing may be achieved in the same vacuum chamber used to deposit the metal layer 120 and/or said protective layer 160. In another potential embodiment, outgassing of the substrate may be performed in a separate chamber. In another preferred embodiment the substrate 110 is degassed by a process including winding said substrate on a heated drum. Said degassing process is preferably undertaken within a vacuum to allow sufficient degassing at a temperature between 40° C. to 80° C. The lower outgassing temperature may assist with preventing or reducing thermal damage to the substrate 110. Additional degassing and drying processes maybe also be required at higher temperatures to remove other solvents present in said substrate from the manufacturing process.

Metal layer 120 may be fixed to the substrate via application of a thin metallic film by means of sputtering, rotary screen printing, block screen printing, transfer printing, jet printing, spraying, sculptured roller or other methods. The metal layer may be applied to a substrate in a continuous or discontinuous pattern or array whereby said metal layer covers the entire surface of the substrate or part of the surface of said substrate.

Figure 2A:
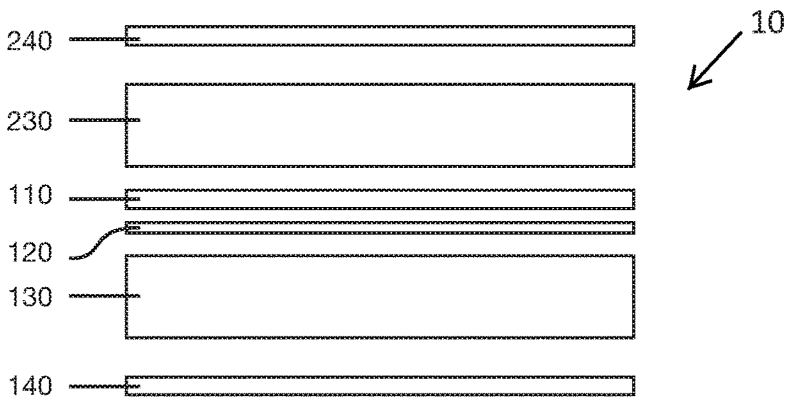
FIGS. 2A to 2E are schematic diagrams illustrating further embodiments of composite materials including layering combinations of substrates, metal layers and insulating layers.

FIG. 2A shows another embodiment similar to FIG. 1A with the difference being that the first substrate 110 not the most distal layer and is disposed between first insulation layer 130 and a second insulation layer 230. In this embodiment, substrate 240 is the most distal layer and substrate 140 is the most proximal layer, and reference may be made to these directions. Preferably, each of the first substrate 110, first insulation layer 130 and second insulation layer 230 are moisture vapour permeable so that the entire composite is moisture vapour permeable. Layer 140 may be suitable for contact with skin of a wearer if the textile 10 is used for a garment, and the outer layer 240 may be treated with a chemical treatment process such that a desired attribute can be imparted to the fabric. It will be appreciated that the face layer 240 of this embodiment may be the only layer which is treated with a chemical treatment process. In another embodiment, any substrate can be metalised and then the substrate and metal layer undergo a chemical treatment process in which a coating (such as a protective coating) is formed on both the substrate and the metal layer thereon. It will be appreciated that a protective coating can be applied during the metal deposition process or immediately before and/or after metal deposition. The substrate and the metal layer may be encapsulated by the coating. If the substrate and/or metal layer are cut, then the coating may no longer encapsulate, or surround, said substrate and/or metal layer. The protective coating may be a water-repellent coating or another protective coating. While the term "coating" is used, the term need not encapsulate or completely cover all portions of the substrate and/or metal layers and may be considered to be a protective layer rather than a coating. As such, while the coating may at least in part cover the metal layer, any reference to insulation being in contact with the metal layer may include contact with the protective coating of the metal layer rather than directly on said metal layer. It is preferred that any coating on the metal layer is preferably infrared transparent to allow radiant reflection to occur. The metal layer may be more resilient and/or scratch resistant after being coated with a protective coating.

Optionally, layers 140 and/or 240 shown in the Figures are not used and at least one face of each insulation layer 130, 230 can be exposed. If outer layer 240 is not present, then layer 110 may be chemically treated by conventional processes to reduce the potential for ingress of fluids, and more particularly liquids into layer 130. Optionally, a membrane (not shown) may be disposed between layers 110 and 120 which is either hydrophilic or hydrophobic depending on the desired used of the textile 10. Similarly, when outer and inner layers 140 and/or 240 comprise a metal layer, a membrane may be disposed between said metal layer and the inner 140 and/or outer layers 240. It will be appreciated that a hydrophilic or hydrophobic membrane, coating or layer may be optionally disposed between any of the layers and substrates of any of the embodiments. Membranes for use in any of the described embodiments may be selected from the group of; a moisture vapour permeable membrane, liquid impermeable films or substrates, and may include hydrophobic porous membranes, hydrophilic non-porous membranes, nanofiber web membranes, nanostructure membranes, and others known in the art. Typical membranes may be constructed from a polymer, such as PU, PP, PTFE, PE, PEU or any other common membranes known in the art.

As shown in FIG. 2A, the additional insulating layer 230 is positioned on the distal side of substrate 110, and additional substrate layer 240 is adjacent to the distal surface of insulating layer 230. Insulation layer 230 provides additional insulation and may further reduce conduction of said metal layer 120. In other embodiments, additional metal layers are disposed on predetermined substrate layers to further increase the thermal resistance of said textile composite.

Figure 2B:
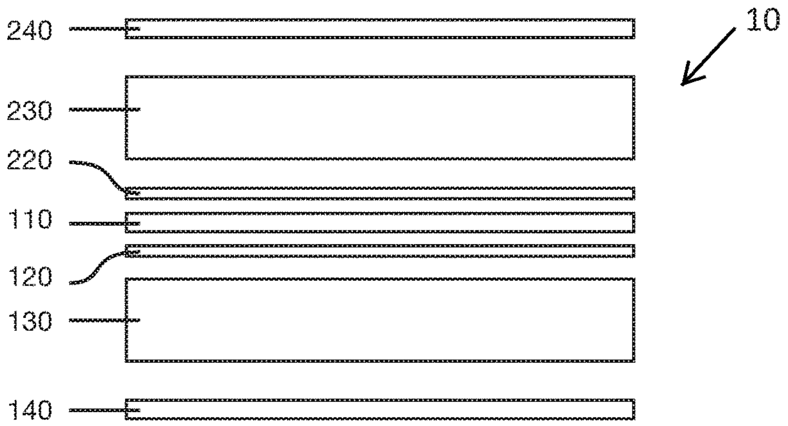

A further embodiment is shown in FIG. 2B, in which a second metal layer 220 is disposed on the distal surface of substrate 110. Each metal layer may provide for a radiant barrier, and the substrate 110 between the metal layers 120, 220 provides for a layer of insulation which inhibits conduction between said metal layers 120, 220. Metal layer 220 may be used to reflect radiant energy distal substrate 110 and/or reduce emission of radiant energy from the textile 10.

Figure 2C:
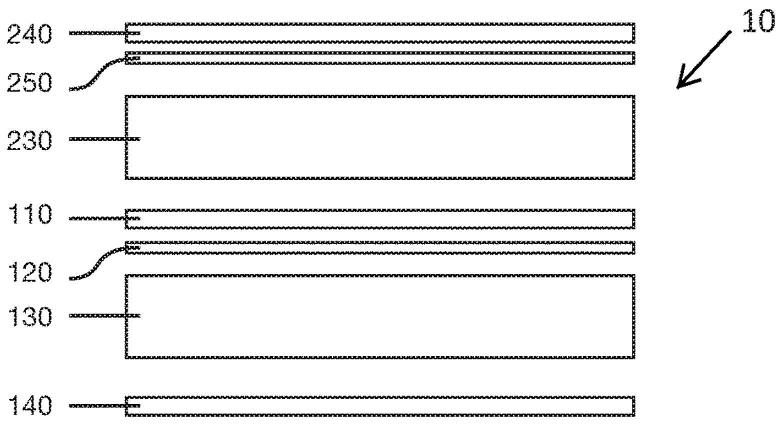

In yet another embodiment shown in FIG. 2C, a further metal layer 250 is disposed on substrate 240. As shown, the further metal layer 250 is disposed on the proximal surface of substrate 240 such that a radiant barrier is provided adjacent the face substrate. The face substrate is the substrate positioned most distal in the composite material, and an inner substrate is the substrate which is positioned most proximal. The terms proximal and distal may be relative to the intended position the skin of a wearer, with the proximal side of the textile being adjacent to the skin of a wearer, and the distal side being the side which is in the direction of the environment.

Figure 2D:
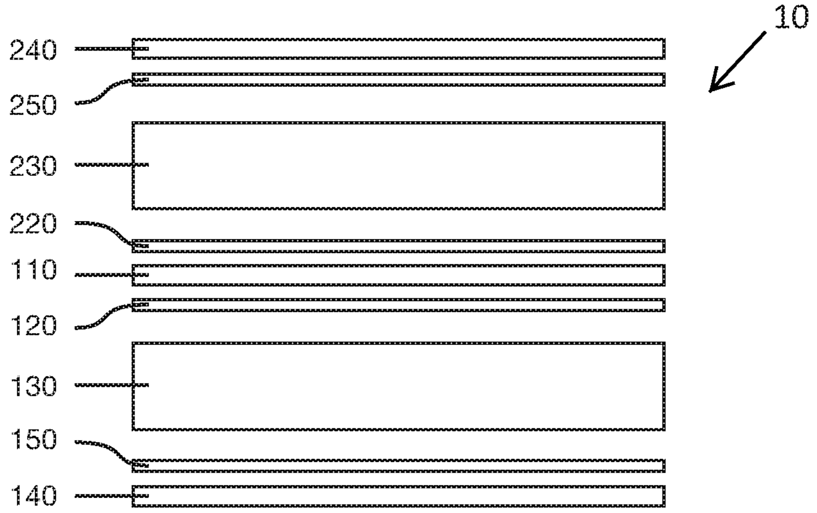

A further embodiment shown in FIG. 2D illustrates, a second metal layer 220 disposed on the distal surface of substrate 110, a third metal layer 250 is disposed on the proximal surface of substrate 240 and a fourth metal layer 150 is disposed on the distal surface of substrate 140. FIGS. 2B to 2D are similar to FIG. 2A in that substrate 240 is the most distal layer and substrate 140 is the most proximal layer, and reference may be made to these directions. With respect to FIG. 2E, substrate 270 is the most distal layer and substrate 140 is the most proximal layer. Substrates 140, 110, 240, 270 may all be non-woven fabric layers, woven fabric layers, stretch woven fabric layers, knitted fabric layers and/or cloth layers, or combinations thereof. All substrates 140, 110, 240, 270 of the textile may be formed from the same material or may be any predetermined fabric, cloth or polymer layer and may be individually treated or be imparted a desired property. The densities, knits, structures, fibre sizes and/or weaves of substrates 140, 110, 240, 270 may optionally be varied to allow for a different desired breathability, water permeability, or flexibility at each layer. Optionally, only the inner substrate and the face substrate are may be coated with a protective layer as these layers are likely to receive the most abrasion or exposure to external liquid sources, such as sweat, snow or rain.

It will be appreciated that the embodiments of FIGS. 1A, 1B, 2A, 2B, 2C, 2D and/or 2E could be inversed or inverted, or at least partially inversed or inverted, as to produce layers in the opposite configuration of those described/illustrated. For example, the proximal and distal directions of the embodiments shown may be swapped.

Figure 2E:
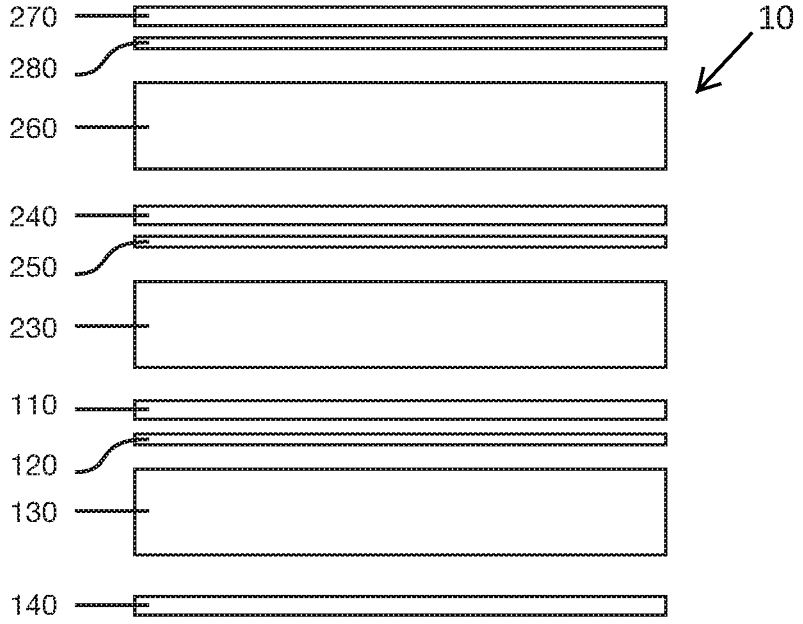

FIG. 2E shows an embodiment of the present invention that utilizes a third insulation layer 260. This embodiment shows a first substrate 110 with a metal layer 120 disposed thereon. A first insulation layer 130 is disposed adjacent to metal layer 120, and a second substrate—intended to face the heat source, such as the body of the wearer—is disposed adjacent to the proximal surface of the first insulation layer 130. A second insulation layer 230 is disposed on the distal side of the first substrate 110. The second insulation layer 230 is disposed on the proximal side of second metal layer 250, and metal layer 250 is disposed on the substrate 240. The third insulation layer 260 is disposed on the distal side of substrate 240. Further, fourth substrate 270, which has third metal layer 280 disposed thereon, is disposed adjacent to the distal surface of third insulation layer 260.

Figure 2F:
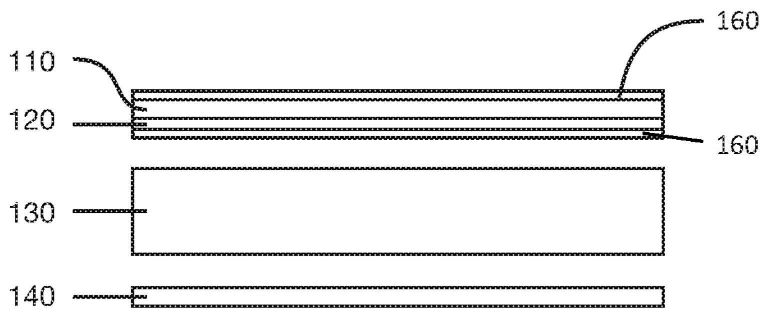
FIGS. 2F to 2L illustrates embodiments of textiles with protective layers formed on metal layers.

FIG. 2F illustrates another embodiment of a substrate 110 coated with metal layer 120 with primer layer 115 and protective coating layer 160 coated over both said substrate 110 and said metal layer 120, insulation layer 116 adjacent to said metal layer is provided and additional substrate 140 adjacent to opposing surface of insulating layer to said metal layer.

Figure 2G:
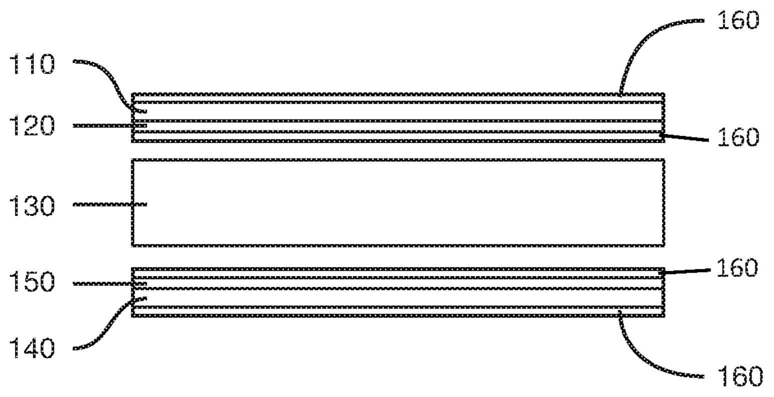

In the embodiment shown in FIG. 2G, a second metal layer 150 is coated on substrate 140 on the surface adjacent to said insulating layer respective protective coating layers 160 coated over both said substrate 140 and said metal layer 150.

Figure 2H:
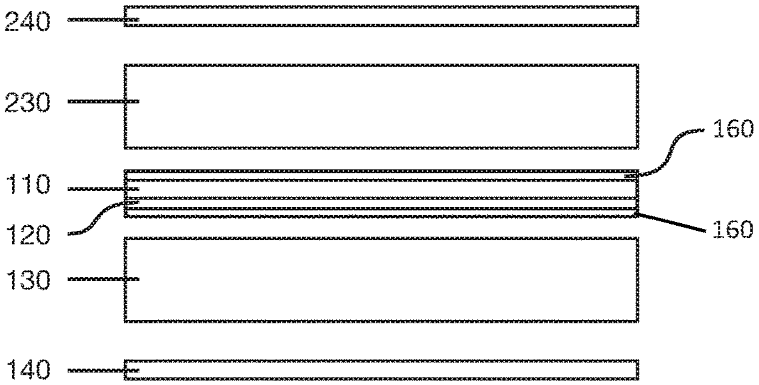

FIG. 2H illustrates a further embodiment, similar in construction to that of FIG. 2A, but with a protective coating 160 disposed on the metal layer 120, and a further protective coating 160 disposed on the distal surface of the substrate 110.

Figure 2I:
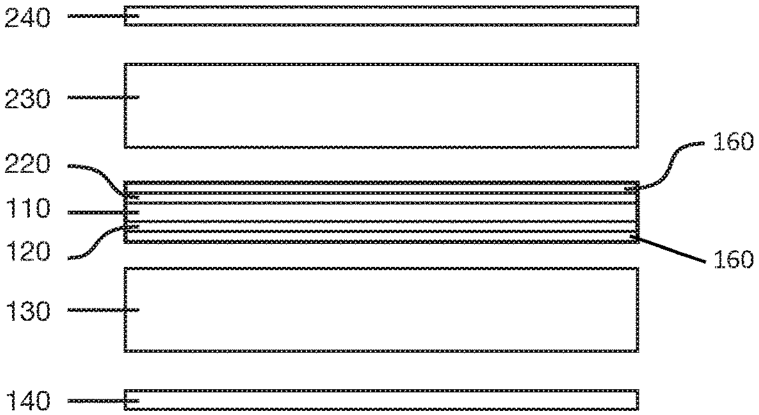

Turning to FIG. 2I illustrates yet another embodiment of the composite textile 10. In this embodiment, the configuration of the textile is substantially the same as that of the embodiment of FIG. 2B, with the addition of a protective coating 160 on metal layers 120, 220.

Figure 2J:
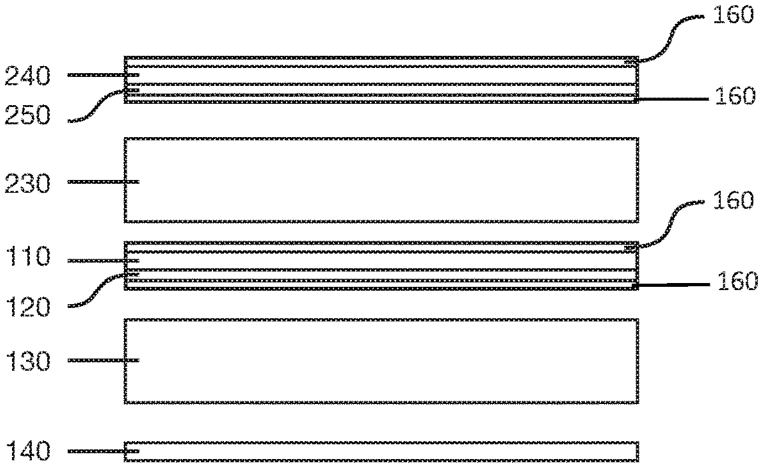

FIG. 2J illustrates an embodiment similar to FIG. 2C, but further includes protective layers 160 disposed on substrate 110, metal layer 120, metal layer 150 and the distal surface of substrate 250.

Figure 2K:
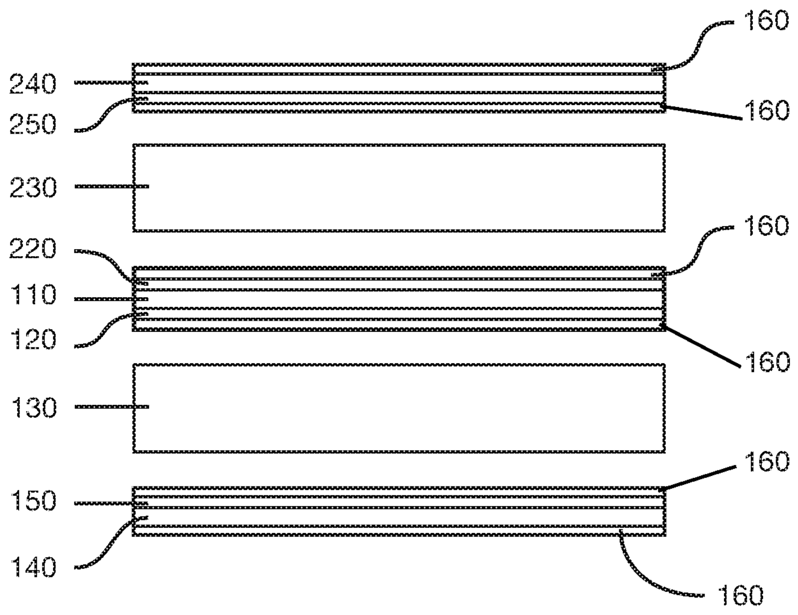

FIG. 2K shows an embodiment, which is similar in construction to FIG. 2D, further comprising protective coatings 160 disposed on metal layers 120, 220, 150, and 250, and also having a protective coating 160 on the proximal surface of substrate 140 and a coating 160 on the distal surface of substrate 240.

Figure 2L:
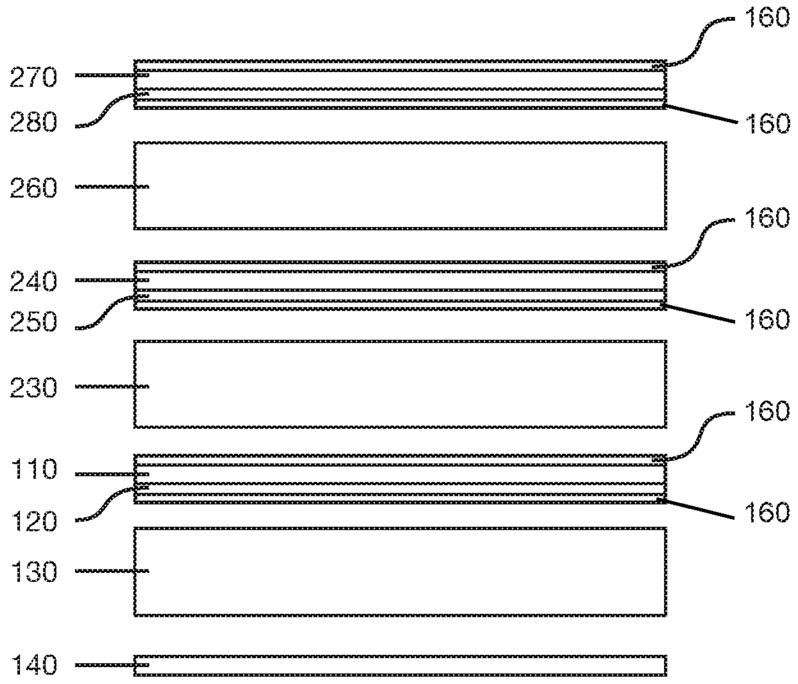

FIG. 2L illustrates an embodiment similar to that of FIG. 2E, wherein protective coatings 160 are disposed on metal layers 120, 250, and 280, and further protective coatings 160 are disposed on the distal surface of substrate 110, the distal surface of substrate 240, and the distal surface of substrate 270.

It will be appreciated that each protective coating of the textile may be a different protective coating or may have a different functionalisation such that desired properties may be imparted to the textile 10. Each metal layer and or substrate used to form the textile 10 may be primed before application of a respective protective coating 160. Primers 118 may only be desirable for some types of functional coatings 160.

Each substrate may have a primer applied to the substrate in advance of the application of a metal layer. If the primer is applied, the primer 118 may be considered to form part of the metal coating of the textile 10.

It is preferred that each metal layer is disposed adjacent to an insulation layer which provides insulation against conduction and convection. Said insulation layer preferably comprises non-woven or knitted insulation construction and is formed from synthetic fibres such as polyester, polypropylene, polyamide or other synthetic fibres but may also be comprised natural fibres such as wool, silk or cotton.

The insulation layers may be of any predetermined thicknesses, materials and configurations. Predetermined insulation structures may also be provided such that desired permeability, infrared transparency, emissivity, breathability, porosity, void configuration or any other desired property are provided by the insulation layer. Each insulation layer may be of varying thicknesses to allow for a more desirable radiant barrier protection. For example, the thickness of the insulation layer near to the skin of a wearer (proximal insulation layer) may be relatively thinner than a second insulation layer distal the first insulation layer. This may allow for a radiant barrier positioned between the two insulation layers to more effectively reflect radiant heat as the insulation layer is less likely to block the reflected heat. As such, the radiant protection may be improved. The second insulation layer distal the metal layer (radiant barrier) may then be relatively thicker than the first insulation layer and retain heat within the textile or a garment formed therefrom.

Optionally, an infrared transparent coating may be applied to a substrate and/or a metalised layer thereon. These coatings preferably comprise silica aerogels which may have between 50% to 98%, or in some cases up to 99.8% voids by volume. Silica aerogels may be formed by subcritical drying processes. Carbon or metal oxide aerogels may also be used depending on the desired application. Aerogels used in coatings or insulation may have a polymer or rubber coating applied thereto which allows for the aerogel to be flexible and reduces the fragility of the aerogel. It will be appreciated that the polymer coating may also infrared transparent such that the coating or insulation is infrared transparent to allow for improved movement of radiant energy. Coatings with infrared transparent functionality may be applied by evaporation techniques, spraying techniques, magnets, film transfer, sacrificial films, doping, pad coating, knife coating, foam coating printing or any other desired application technique.

Optionally, if a coating or insulation layer is made from an infrared transparent material, the structure of the coating or insulation layer is a contiguous fibrular network which allows for voids to be formed while also maintaining a desired structure and/or thickness of the insulation layer or coating. Silica aerogel powder or particulates may be used to form a portion of a coating applied to at least one of; a substrate, metal layer(s), and insulation.

While the thinness or thickness of the insulation layer is important with respect to providing thermal protection, the insulation density and the insulation porosity are also relevant with respect to allowing a radiant barrier to function. It is preferred that a significant portion of the radiant barrier not be in contact with the insulation layers as the radiant barrier will function more effectively if the surface is exposed. It will be appreciated that a transparent coating or film on a radiant barrier may still leave the radiant barrier exposed. As such, it may be desirable for the area of the metal layer contacted by the insulation to be less than 50% actual contact area. In another embodiment, it may be desirable for the actual contact area of the metal layer contacted by the insulation to be less than 40%. In another embodiment, it may be desirable for the actual contact area of the metal layer contacted by the insulation to be less than 30%. In another embodiment, it may be desirable for the actual contact area of the metal layer contacted by the insulation to be less than 20%. In another embodiment, it may be desirable for the actual contact area of the metal layer contacted by the insulation to be less than 10%. In another embodiment, it may be desirable for the actual contact area of the metal layer contacted by the insulation to be less than 5%. In another embodiment, it may be desirable for the actual contact area of the metal layer contacted by the insulation to be less than 1%. It will be appreciated that the less contact area the better the radiant barrier will reflect radiant energy and/or reduce emission of radiant energy.

Insulation layers may be formed from a non-woven synthetic with varying densities to allow for channels or regions of different insulative properties. This may allow for less dense regions, or regions with different thicknesses, to allow more radiant energy to pass through which can be reflected by a radiant barrier. In this way thermal energy can be regulated or controlled more effectively, particularly around regions of the body which may be required to have a higher breathability. Further, functional treatments may be applied to the fibres of non-woven insulations by either post-treatment processes or by including functionalised treatments within the binder. This may allow for the binding of the non-woven insulation while also providing for a desired treatment to be imparted to the insulation material. Providing functionalised treatments at bonding areas of non-wovens may also provide an advantage over conventional techniques as bonding areas can be provided with functionalisation, and further functionalisation treatments may also be provided at a later time if desired. Optionally, the non-wovens may have an infrared transparent coating or a coating which reduces conduction applied thereto, such as an aerogel or a coating comprising aerogel, and more preferably a silica aerogel. Infra-red reflective coatings may be used to reduce infra-red absorption.

As such, insulation layers may be preformed in a desired shape to reduce the amount of insulation in contact (actual contact area) with the radiant barrier relative to conventional insulation layers. Processes such as moulding, embossing, printing, tacking, cutting, melting, ultrasonic welding or any other desired process may be used to modify the shape and/or density of the insulation layer. Embossing an insulation layer may create ridges or peaks and troughs in the contact surfaces of the insulation which may bias the radiant barriers away from the insulation layer.

In a further embodiment, a composite material may comprise a substrate 110 with a metal layer 120 and an aerogel layer (not shown) which may act as insulation 130. The aerogel layer may be coated onto the metal layer 120 or may be bonded thereto. The aerogel layer be of a thickness between 0.1 mm to 50 mm, but more preferably in the range of 1 mm to 20 mm. The thickness of the aerogel layer may depend on whether other insulation materials are also used, and whether the aerogel is a coating or a bonded layer. Optionally, the metal layer 120 may have a scrim layer (not shown) bonded thereto before an aerogel is provided to the composite. In this way, the structure of the composite material, from distal layer to proximal layer, is; substrate 110, metal layer 120, a scrim layer and an aerogel layer. If no scrim layer is provided, then the composite material may constructed with a substrate 110, a membrane, metal layer 120 and an aerogel layer. In another embodiment of a composite material, there is provided from distal layer to proximal layer; a substrate 110, a membrane, metal layer 120, a scrim layer and an aerogel layer. In this embodiment, the position of the metal layer 120 and the scrim layer may be swapped such that the metal layer 120 is proximal the scrim layer, and therefore the scrim layer was applied to the substrate in advance of deposition of the metal layer. Aerogel layers may also be disposed directly on substrate 110, and optionally on both sides of the substrate 110. The metal layer may have a protective coating applied thereto before an aerogel layer is provided to the metal layer. In another embodiment, the aerogel layer may be provided to act as both an insulation layer and a protective layer for the metal layer. It will be appreciated that any embodiment described herein may utilise at least one aerogel layer which may replace a coating, and/or be provided in addition to a coating, and/or may be used to replace an insulation layer, and/or to supplement an insulation layer. In yet a further embodiment, the substrate 110 may have an aerogel layer applied thereto, and a metal layer deposited onto the aerogel layer, and then a further aerogel layer may be provided, such that the metal layer is disposed between two layers of aerogel.

Any number of substrates, metal layers, membranes, scrim layers and aerogel layers may be used in any embodiment disclosed herein, and are not limited to the embodiments as disclosed above.

In yet another embodiment, the insulation layer has a mesh or a lattice structure. Multiple meshes or lattices may be laid on top another mesh or lattice, or onto a non-woven material or closed cell material. The mesh, grill, screen, or lattice may have a predetermined aperture size, and a predetermined thickness. Herein, the terms; mesh, 'grill', 'screen' and 'lattice' will collectively be referred to as a 'lattice' for simplicity. It will be appreciated that the lattice may be formed from a single element, or may be formed from discrete elements woven or bonded together. The lattice may also be formed by cutting a sheet of material to form apertures or cut away portions or shapes. Cut portions may not be fully separated from the lattice may be folded over and fixed to the lattice or plastically deformed or treated to overlap portions of the lattice. Alternatively cut portions may be deflected upwardly and/or downwardly and act as protrusions or projections which can space the adjacent layers from the lattice structure. Protrusions may project in a pattern or predetermined configuration such as a one-up, one-down configuration to evenly distribute the adjacent layers. If multiple layers of lattices with protrusions are used, the free ends of the protrusions may be connected or fixed together, or the projections may be fixed to an edge of a cut portion of an adjacent layer. If the free ends are fixed together, the lattices can be rotated 90 degrees to 180 degrees relative to an adjacent lattice. At the intersection regions or nodes of the lattice a bead or riser may be disposed at predetermined nodes which can space a radiant barrier ever further from the surface of the lattice which may again improve the radiant barrier as there is less of the insulation in contact with the radiant barrier. The nodes of the lattice adjacent to an aperture may form any desired predetermined shape, such as a circle, triangle, square, pentagon, regular polygon, or irregular shape.

In another embodiment, the insulation layer is a non-woven insulation layer with a lattice or spacer applied to at least one of the proximal surface and the distal surface. The spacer may be an array of structures of any predetermined shape and thickness/height. Optionally, the insulation layer is replaced by only the spacer, with the spacer providing support to the textile 10 and spacing the metal layer from a substrate, such as a fabric substrate or woven substrate, or more generally an inner layer of the textile. It will be appreciated that an inner substrate (such as layer 140) may be removed or omitted from the textile in some embodiments. Each layer of insulation of the textile 10 may optionally be replaced with a spacer material. Replacing an insulation layer with a spacer material may reduce the material required to manufacture the textile, and may be lighter than the use of an insulation layer. Preferably the spacer is a flexible and resilient material, such as foam, or other synthetic material as discussed herein. If foam is used, the foam may be memory shape foam which can elastically deform during use and return to a desired shape.

When using multiple layers of lattices, the lattices may have similar apertures formed and the lattices may have uniform or regular cross sectional area. The lattice is preferably formed from an insulative material such that heat is not conducted through to the radiant barrier. The cross sections can be aligned in parallel at least in one direction (such as the X-axis or the Y-axis). One layer of the lattice structure may be transversely and/or longitudinally offset relative to an adjacent lattice layer. If there are more than two layers of lattice, the lattices may be aligned in a sequence for alignment. This is to say that every second lattice may be aligned, or every third lattice may be aligned or any other predetermined alignment of lattices such that the structure forms a desired shape. Preferably, if multiple layers of lattices are used the lattices are offset such that flexibility of the spacer material can be improved for comfort and wearability.

The apertures of the lattices may provide for paths for radiant energy to be transferred to and from the radiant barrier which can improve the overall warmness of a garment. Preferably, the spacer contact with a radiant barrier is minimised such that more effective radiant reflection can be achieved. The contact points of the layers of lattice can be fixed together by conventional bonding methods, such as adhesive, welding, heat treatment or any other desired method.

While the lattice can be formed from a sheet of material, the components of the lattice may be formed by extrusion methods, injection methods, or moulding. If the lattice comprises struts or elements connected (or integrally formed), the struts of the lattice may be circular, rectangular or any other predetermined shape in cross section. If the struts are connected, it is preferred that they are connected with a regular spacing and preferably transverse and longitudinal struts are connected perpendicularly.

The textile in a simple embodiment comprises a first substrate and a metal layer only. Optionally, the textile may further include a spacer and/or insulation layer. The spacer can be bonded or fixed to the metal layer and/or the inner fabric layer. The spacer is preferably formed from an array of polymeric foam segments such that they are insulative in nature. In one example, the spacer is formed from polymeric foam. Other materials may be used to form the spacer such as a non-woven, fibre insulation, fibre non-woven insulation, knitted spacer, an encapsulated void, or a combination of a substrate and an insulation.

If a substrate and insulation is used for the spacer layer, the substrate can be used to bundle portions of insulation material. For example, the fabric can be formed to have at least one capital Omega shape (LI) in which the insulation material is received in the concave portion of the LI shape. Once the insulation is received in the substrate the substrate can be fixed in place, bound or sealed to retain the insulation therein.

The metal layers used in thermal insulation of the invention should be thin, light-weight, and substantially as flexible and drapeable as fabric conventionally used in outer garments. These properties may be achieved by limiting the thickness of the metal layer relative to the thickness of the substrate the metal is disposed on. As an example, the substrate may be 110 may be 500 to 1,700 times thicker than the thickness of the metal layer. It will be appreciated that the substrate may be substantially thicker than suggested above, and may instead be 5,000 to 10,000 times thicker than the metal layer depending on the application. For example, canvas or woven polyester may be used as a substrate which can be around 3,600 to 9,000 times thicker than the metal layer. In these examples the metal layer is around 50 nm to 100 nm thick, although other metal layer thicknesses may be used if desired. Having metal layers with reduced thicknesses can allow for faster manufacture of the textile 10, and also reduce the overall material costs. Metal layers at thicknesses of between 5 nm to 100 nm may generally have desirable reflective properties, are sufficiently durable and strong, and do not noticeably impact the drapeability or flexibility of the substrate.

As a further example a typical adult Medium sized garment formed from the textile as shown in FIG. 1A may have 0.5 g to 1.5 g of aluminium in the metal layer, or more preferably around 0.9 g of metal may be present. Using a metal layer may have the advantage of reducing the amount of polyester used in a garment and may reduce the amount of polymers required for a garment, and may also reduce microplastics generated from a typical garment. It will be appreciated that the overall weight of the metal within a garment will depend on the metal and/or metal alloys used, the size of a garment and the thickness of the metal layer(s). It will be appreciated that for each additional metal layer the overall weight of the metal layers will also increase. Each metal layer lay reduce the overall insulation layer volume and weight. For example, the use of a single metal layer may remove 30 g to 200 g of a non-woven insulation, such as polyester and therefore reduce the overall embodied energy of a garment and improve the sustainability of a garment. Removing polymers from garments has the added benefit of reducing the amount of microplastics entering the environment from every day wear and washing of the garment. Further, using a metal layer is likely to lower the overall $CO_2$ produced and/or water consumed to manufacture a garment depending on the metal or metal alloy used in the garment.

The metal layer may be vapour-deposited directly on a substrate, or the metal layer can be formed on a transfer liner and then transferred to the base sheet and adhered or bonded thereto. The metal layer may be selected from aluminium, aluminium alloys, copper, copper alloys; and other metals or materials which reflect substantial portions of incident thermal radiation. Preferably, the metal layer is also porous to allow for breathability. At thicknesses of between 30 nm to 500 nm the breathability of the metal layer is still desirable and does not adversely impact the breathability of the substrate.

As suggested previously, it is desirable for the metal layer to be open or not in contact over at least around 50% of its surface area to allow for radiant heat reflection. Preferably the spacer layer covers no more than 50% of the area of the reflective sheet. However, it will be appreciated that the spacer may be required to support the metal layer from an adjacent layer, and therefore a minimum contact area is required between the spacer and metal layer. The minimum actual contact area may be around 0.01% to 5% depending on the material used to form the spacer.

A material adapted to provide the needed combination of properties to be exhibited by the spacer is a resiliently compressible material, such as a polymeric foam or a synthetic fibre material. Some suitable foams which can be used may include polyurethane foams, neoprene and nitrile rubber foams.

A spacer layer may be moulded in any predetermined array, structure or network. Alternatively, a continuous sheet of material may be cut and then expanded to the shape shown. The spacer can be adhered to the metal layer so as to provide stability to the textile 10 in a completed garment.

If the spacer is adhered to the metal layer, a thin layer of adhesive is applied between the separator layer and the metal layer. It will be appreciated that the spacer material may only have one side fixed to an adjacent layer or substrate such that relative movement between the spacer and an adjacent substrate or layer may be achieved which can increase the wearability and comfort of a garment constructed from the textile. It will further be appreciated that the spacer material may be adhered on both a proximal and distal side to adjacent substrates and/or layers.

It is preferred that the optimal thickness of the spacer material is between 2 mm to 10 mm, although any desired spacing may be used depending on the desired functionality of the garment. Larger spacing may be desired if temperatures external the wearer are more extreme.

An embossed substrate may be used as a substrate which a metal layer is disposed on, and an insulation layer can be disposed adjacent thereto. Alternatively, an embossed substrate may be applied to a substrate and the metal layer can be disposed on the embossed layer such that a desired reflectance can be achieved. Further, the embossed layer may be used to shape the metal layer to partly create a spacer for adjacent portions of the metal layer. This is to say that peaks of the embossed layer may be in contact with a spacer material or an insulation material, which can increase the area of the metal layer which is not in contact with said spacer or insulation layer adjacent. The embossed layer may also be used as a spacer or pseudo-insulation layer, and can be embossed with a pattern or design which can allow metal layers disposed thereon to elongate or deform when the embossing is under tension, for example during wear of a garment formed from the textile. Elongation of the embossed layer may mean a relative movement of the metal layer as embossing is flattened or under tension causing undulations of the embossing to move towards an un-embossed configuration.

In one embodiment, the embossed layer may also seal in pockets of air or gas. Alternatively, a substrate with portions of closed cell polymers or elastomers may be used which can form air pockets to provide a shape to the substrate. A metal layer may be disposed on the substrate with the closed cell material. While the additional embossed layer may be used to impart a desired shape, the flexibility of the textile 10 may be reduced, and therefore the substrate, such as substrate 110, may be embossed, stamped or moulded to include the desired shape, and the metal layer disposed on the embossed substrate. Optionally, the substrate and the metal layer may be embossed, stamped or moulded together.

In yet a further embodiment, the substrate 110 can be embossed which allows for additional air gaps to be formed between the substrate and an insulation layer or spacer. It is preferred that the embossing allows for elongation or elastic deformation of the substrate 110 when in use. The embossing pattern or embossing array may be a series of shapes or tessellations which impart a desired embossing shape or embossing property. For example, embossing may space more of substrate 110 from insulation layers which can improve functionality of any radiant barrier or metal layer applied thereto. Stretch knitted and woven fabrics may have particular advantages from receiving an embossing treatment. A stretchable embossed non-woven material may be combined with a stretch knitted and/or a stretch woven fabric and function collectively as an embossed layer. This is to say that an embossed layer can be combined with a non-embossed knit or woven layer.

Figure 6A:
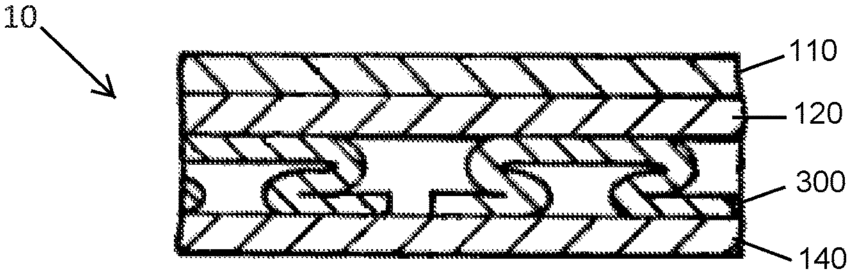
FIGS. 6A and 6B illustrate an embodiment of a textile with a spacer material used as the insulation layer.
Figure 6B:
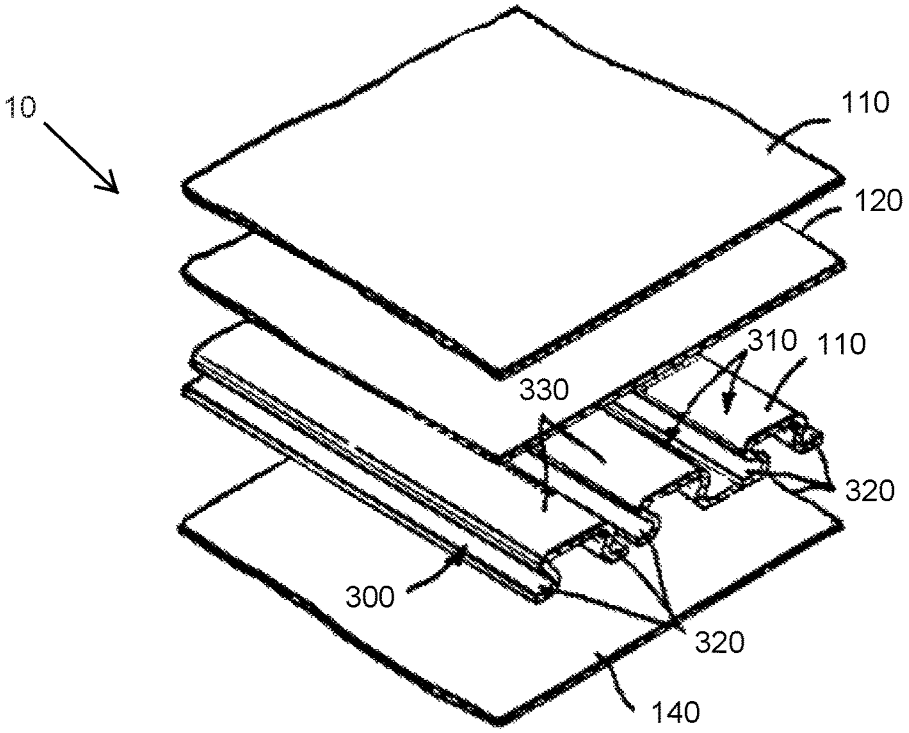

In another embodiment, the textile has an outer shell or substrate 110, a metal layer disposed on substrate 110. An inner layer 140 is arranged proximal of the metal layer and a spacer 300 is disposed therebetween. The spacer 300 may be formed from spacer elements as shown in FIGS. 6A and 6B. The spacer elements provide air spaces between the inner layer 140 and the metal layer 120 on substrate 110 and thus provide thermal insulation while maintaining minimum weight. Each of the spacer elements 310 is shown as generally U-shaped with legs 320 attached to at least one of the inner layer 140 and the metal layer, and a body portion 330 stitched to the other of the inner layer 140 and the metal layer 120 depending on the orientation of the spacer. The spacer 300 elements are preferably formed from an insulative material and allow for flexibility of the textile when in use.

It will be appreciated that the inner portion of the U-shape may be metalised, or have a metal layer which acts as a radiant barrier. If this is the case, then metal layer 120 as shown in FIGS. 6A and 6B may be removed from the textile 10. Preferably any portions of the spacer which are fixed to or in contact with an adjacent substrate do not have a metal layer thereon such that conduction of heat can be reduced thereby improving the overall insulative properties of the textile or garment made therefrom.

In an unillustrated embodiment, the spacer elements may be laminations of insulative material which are stacked or layered in a desired manner such that columns or shafts of air can be made between the metal layer and the inner layer 140. This allows for radiant heat to move in the columns or shafts and can be reflected by the radiant barrier proximally.

Figure 7:
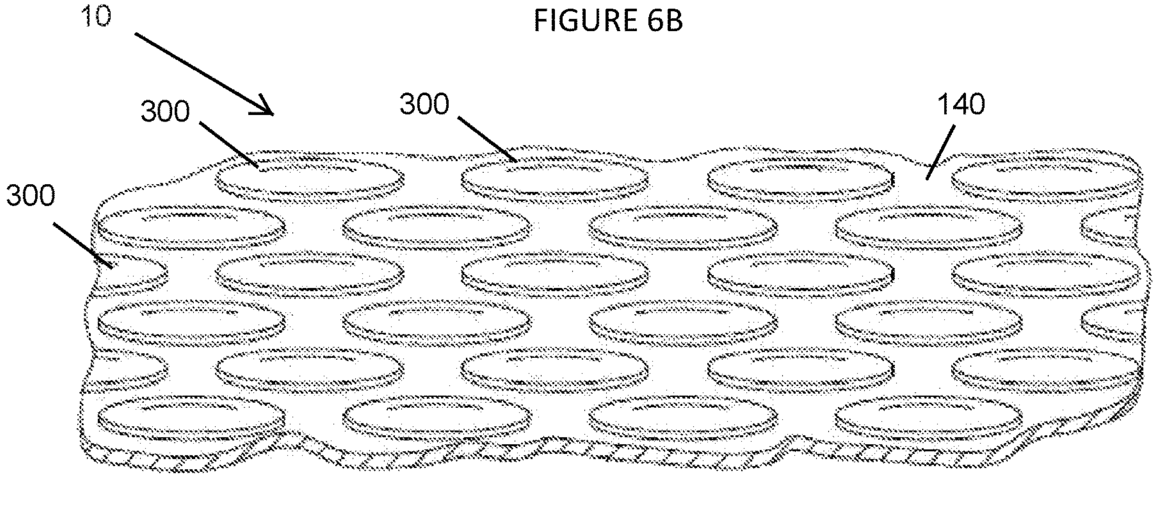
FIG. 7 illustrates an embodiment of a spacer array or spacer series disposed on a substrate.

Referring to FIG. 7 there is illustrated an array of spacers 300 are disposed on a substrate, such as substrate 140. The array of spacers 300 material may be disposed in a predetermined array as shown. The spacer array may comprise spacers with a uniform size and/or height. The spacers 300 in this embodiment are a series or array of beads of insulative material disposed on a substrate. The substrate may or may not have a metal layer thereon. If the substrate comprises a metal layer the beads may be disposed directly on the metal layer. The spacer beads may be formed from the same material or a variety of materials such that predetermined beads have different properties than other beads of the textile 10.

The spacer beads 300 may be printed on the substrate 140 or may be deposited or transferred to the substrate. The beads 300 may have a height which is equal to or greater than the thickness of the substrate deposited on. Multiple beads may be stacked or layered on top of each other to create a desired height of the spacer 300. Preferably, the desired height of the spacer beads when stacked is between 2 mm to 10 mm. Other heights may be achieved and cross bracing of the bead stacks may be required at heights greater than 10 mm if desired. While the beads are shown as having a circular cross section, any shape may be used. In another embodiment, a portion of the bead stack can be coated with, or deposited with, a metal layer such that radiant heat can be reflected and therefore also function as a radiant barrier.

In another embodiment, insulation layers can be combined with at least one substrate by any of the following processes; lamination using an adhesive, high frequency weld, a melt film, a melt fibre between surfaces and a stitching/needling process. The process selected will depend on the application of the garment formed from the textile 10, the substrate materials, and the radiant barriers used in the textile.

Figure 3A:
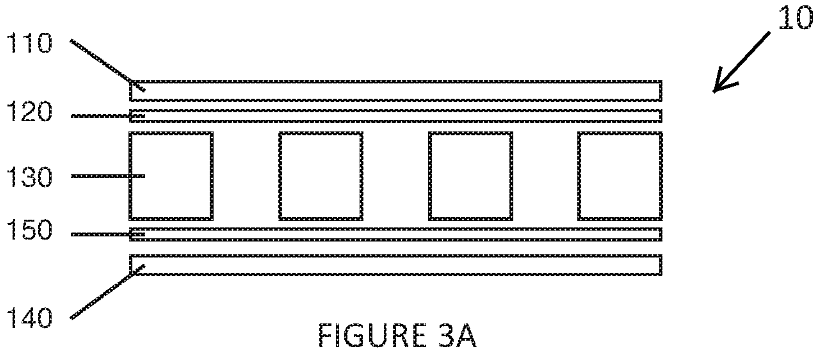
FIG. 3A shows an embodiment of a barrier with a perforated insulation layer.

Referring now to FIGS. 3A to 3F, there are illustrated a number of embodiments of a textile with varying insulation layers. The insulation layers may function as both an insulation layer in addition to being a spacer. Referring specifically to FIG. 3A, there is shown a composite material with a substrate 110 at the distal end, and a further substrate 140 at the proximal end. The distal substrate 110 may be a face fabric or face layer, and the proximal substrate 140 may be an inner fabric or inner layer. Substrate 110 has a metal layer 120 (which may be a radiant barrier) disposed on a proximal side of the substrate, and the proximal substrate 140 comprises a metal layer 150 disposed on the distal side of the substrate 140. The insulation 130 is disposed between the two metal layers 120, 150, and are shown as a plurality of discrete elements. The insulation 130 elements may be fixed to the metal layers 120, 150 at their proximal and/or distal sides. Optionally, each second insulation 130 element may be fixed at only one end, and the remaining insulation 130 elements are fixed at the opposing end. Having the elements fixed at only one end may improve flexibility of the textile. The insulation 130 elements may be any predetermined shape, length and height. Further, the spacing between the elements may be at regular intervals or may be spaced in any predetermined array or with any predetermined spacing. Between the elements are preferably air gaps or voids which can be used to allow radiant energy to travel between the radiant barriers. Optionally, the insulation 130 elements may be cross braced or have bracing to retain the insulation 130 elements in a desired location. Alternatively, the insulation 130 may be a perforated insulation layer which is not fixed to the adjacent substrates or layers.

Figure 3B:
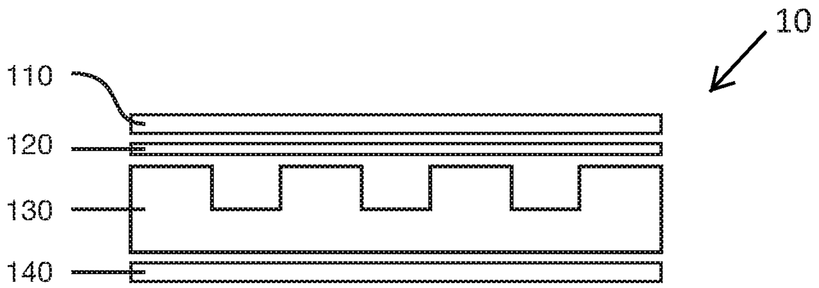
FIG. 3B shows an embodiment of a barrier with an insulation layer with cavities.
Figure 3C:
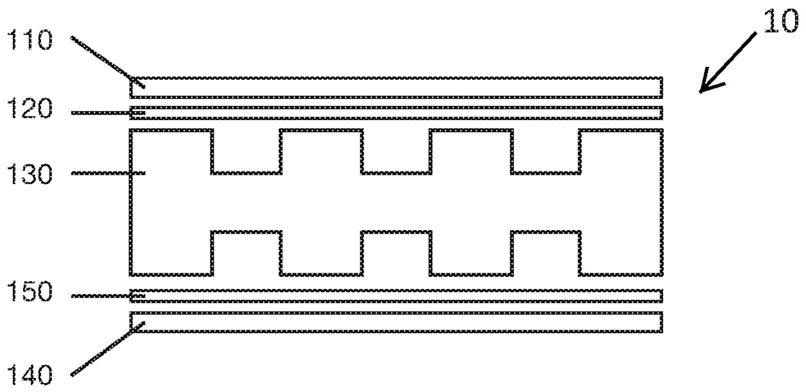
FIG. 3C shows a further embodiment of a barrier with an insulation layer with cavities.
Figure 3D:
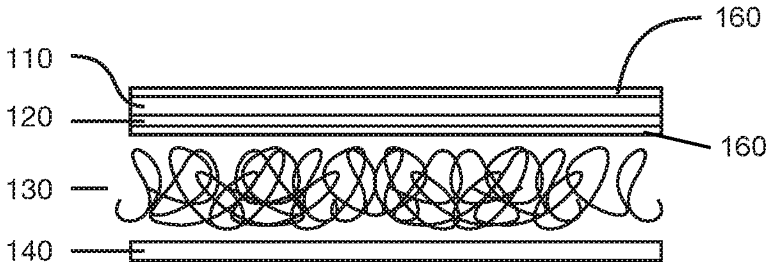
FIG. 3D illustrates another embodiment of a barrier with a non-woven insulation layer and the metal layer comprises a protective layer.
Figure 3E:
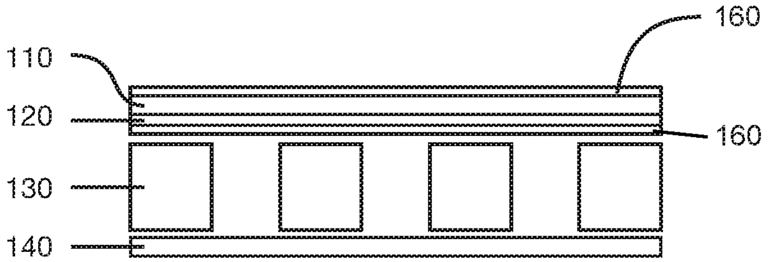
FIG. 3E illustrates a further embodiment similar to the embodiment of FIG. 3A in which the metal layer comprises a protective layer.

A further embodiment is illustrated in FIG. 3E, which is of similar construction to that of the composite textile 10 of FIG. 3A. A protective layer 160 is disposed on substrate 110 and the metal layer 120, respectively. The protective layer 160 may be a functional layer, or may be an abrasion resistant layer. Functional layers may be hydrophobic layers or oleophobic layers, or any other desired functionalised layer as discussed herein.

Figure 3F:
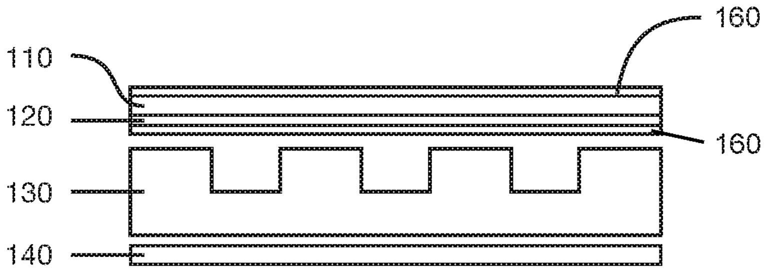
FIG. 3F illustrates a further embodiment similar to the embodiment of FIG. 3B in which the metal layer comprises a protective layer.

The insulation layer 130 of FIG. 3E may be perforated or provided with apertures to increase exposure of at least one metal layer 130. Perforations may be provided in a regular or irregular pattern or array. Gaps formed between multiple sheets or segments of insulation may be considered to form perforations. FIG. 3F depicts another embodiment of the textile 10 in which the insulation layer is embossed or moulded to produce cavities adjacent to the metal layer, which can increase the exposure of metal layer 120. The perforations and cavities may be formed such that at least 50% of the area of the surface of the metal layer is not in direct contact with the insulation layer. Substrate 110 and metal layer 120 are preferably provided with a protective coating and/or functional coating.

Turning to FIG. 3B there is shown a similar textile to that as shown in FIG. 3A. A substrate 110 has a radiant barrier 120 disposed on the proximal side of the substrate. An insulation layer 130 is positioned proximally of the radiant barrier and a further substrate 140 is positioned proximally of the insulation layer 130. The insulation layer 130 comprises a plurality of keyed recesses or cut-away portions on the distal surface. The recesses are preferably disposed adjacent to the radiant barrier 120 such that radiant energy can be reflected and thereby improving the textile ability to retain heat within the textile.

A similar construction to FIG. 3B is shown in FIG. 3F, however FIG. 3F also illustrates a protective layer 160 disposed on both substrate 110 and the metal layer 120, respectively. The protective layer 160 may be a functional layer, or may be an abrasion resistant layer. Functional layers may be hydrophobic layers or oleophobic layers, or any other desired functionalised layer as discussed herein.

Insulation layers may be constructed by a vertical lapping process whereby the height of each lap is arranged to create a textured or stepped surface as shown in FIG. 3F. Optionally, a knitted insulation may be used and constructed from an eyelet mesh or jacquard pattern comprising perforations or embossed features in the insulation layer as shown in FIG. 3E or FIG. 3F. In another embodiment, a knitted insulation may have a raised surface created by a terry loop and/or brushing, napping or sanding process.

FIG. 3C illustrates an embodiment of a textile with an insulation layer 130 with keyed recesses or cut-away portions on both the distal surface and the proximal surface. There are two metal layers 120, 150, which may be radiant barriers, disposed on the proximal and distal sides of the insulation 130 layer and the gaps formed by the recesses can be used to more effectively reflect radiant energy. Metal layer 150 is disposed on distal side of the substrate 140.

A further embodiment of the composite textile 10 is illustrated in FIG. 3F, wherein the insulation layer is a non-woven insulation. Further, the composite textile 10 also comprises a protective layer 160 disposed on both substrate 110 and the metal layer 120, respectively. The protective layer 160 may be a functional layer and/or may be an abrasion resistant layer. Functional layers include hydrophobic layers or oleophobic layers, or any other desired functionalised layer as discussed herein.

The thickness and density of the fibres of the at least one insulation layer may be configured to provide a desired infrared transparency, and maintain the desired infrared reflectance of the one or more metal layers.

FIG. 3D shows the use of a fibre insulation 130 adjacent to metal layer 120 whereby the spacing between the fibres of said insulation layer provide exposure of the metal layer through the insulation. The density of the fibres of the insulation layer adjacent to the metal layer may be selected such that the ratio of the volume of fibre in the insulation to the volume of air in the insulation is between 1:30 and 1:1000 and more preferably between 1:100 and 1:1000 to allow for an infrared transparency, and more preferably an infrared transparency of 5% or greater.

Optionally, at least one insulation layer 130 may comprise a surface pattern, surface texture, surface landscape, density or texture such that a high percentage (50% or greater) of the metal layer is still exposed through the air gaps of the insulation layer, thus maintaining good infrared reflectance of the metal layer(s).

In another embodiment, at least one insulation layer is disposed in a pattern. The insulation layer preferably has a predetermined density and/or texture such that a high percentage of the metal layer is still exposed through the air gaps of the insulation layer, thus maintaining an optimal or desired infrared reflectance of the metal layers. FIG. 4A illustrates an insulation layer which has a series of undulations to increase the area of exposed metal layer within the textile 10. The undulations may be disposed in a regular or irregular pattern and can be formed by conventional cutting processes, laser cutting processes, etching processes, moulding processes, or extrusion processes. Alternatively, the undulations are formed from laminations of insulation material and are bonded together. Bonding the layers of insulation may be achieved by stitching or piecing the laminations and securing the laminations with a tether. The laminations may also be bonded by ultrasonic welding or applying adhesive to the laminations.

In an alternative embodiment, the insulation layers are perforated to provide increased exposure of the metal layer. Perforations may be provided in a regular or irregular pattern or produced by gaps between multiple sheets or segments of insulation.

Figure 4B:
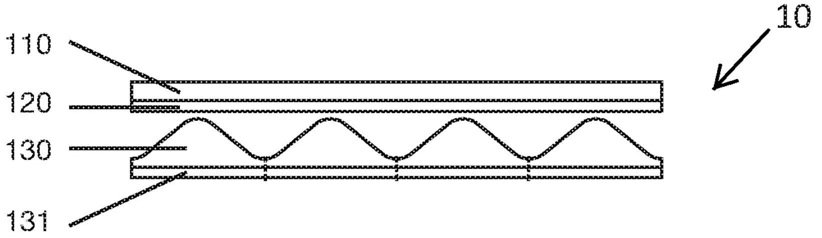
FIG. 4B shows an embodiment of a barrier with an insulation layer with cavities formed.
Figure 4C:
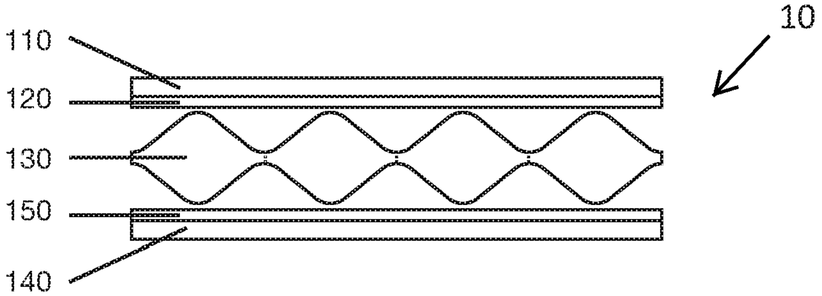
FIG. 4C shows an embodiment of a barrier with an insulation layer with cavities formed.

FIGS. 4B and 4C illustrate further embodiments of an insulation layer whereby the insulation layer is embossed or moulded to produce cavities or undulations adjacent to the metal layer thereby increasing exposure of said metal layer. The perforations and cavities are designed and/or selected such that at least 50% of the area of the surface of the metal layer on which the first insulation layer is disposed is not in direct contact with the insulation layer (actual contact area <50%). While the insulation layer of FIG. 4C is shown as a single insulation layer with an undulating proximal and distal surface, each of the surfaces may be independently embossed or moulded and two layers of insulation may be bonded together or layered to create the insulation layer as shown.

Figure 5A:
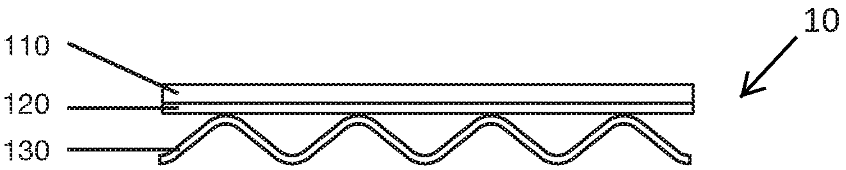
FIG. 5A shows an embodiment of a barrier with an insulation layer that is formed by a moulded or textured 3D substrate creating air gaps proximal a metal layer.
Figure 5B:
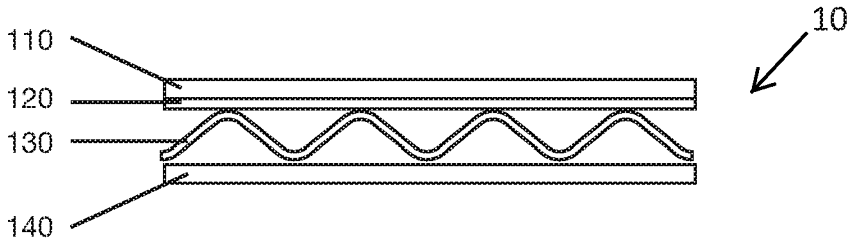
FIG. 5B shows an embodiment of a barrier with an insulation layer that is formed by a moulded or textured 3D substrate creating air gaps proximal a metal layer.
Figure 5C:
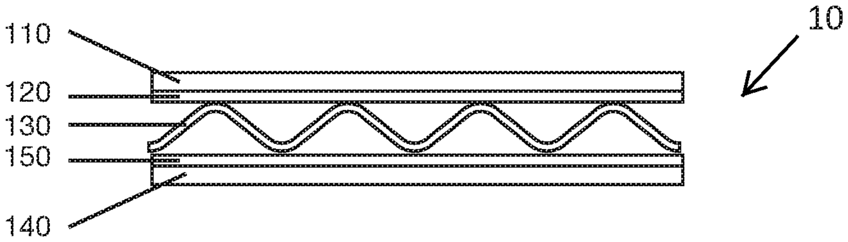
FIG. 5C shows an embodiment of a barrier with an insulation layer that is formed by a moulded or textured 3D substrate creating air gaps adjacent to the metal layers.

Cavities in the insulation layer may be produced by ultrasonic welding, stitching or other binding process that compresses the insulation material in areas to create an air gap between the insulation layer and the substrate as shown in FIGS. 5A, 5B and 5C. In this way the insulation layer may be akin to corrugations. In the embodiment of FIG. 5B the insulation material may be bonded to a backing layer such as a thin non-woven layer to provide structural support to allow a larger cavity size. Some sections of the insulation layer may be thicker than other sections to space an adjacent layer from contacting all of the insulation surface.

In another embodiment, the insulation 130, 230, 260 is a non-woven insulation produced by a vertical lapping process (an example of lapping is shown in U.S. Pat. No. 7,591,049) whereby the height of each lap is varied to create a textured or stepped surface. In another embodiment, the non-woven insulation is formed on a textured conveyor belt during the manufacture process. The textured conveyor belt may be used to form undulations or other desired shapes in the non-woven insulation layer. The non-woven insulation may be known in the art as a "web". Optionally, if the non-woven insulation is textured or formed with a texture, the non-woven insulation may have thickness differentials for a desired compression, or the non-woven insulation may comprise regions with additional treatments or adhesives which can impart a desired rigidity to said regions. The regions may be the regions which are adapted to generally remain in contact with another layer or substrate during use.

In another embodiment, the insulation layer is a knitted insulation layer comprising synthetic or natural fibres or a composite thereof. The knitted insulation can be constructed from an eyelet mesh or jacquard pattern comprising perforations or embossed similar to the insulation layers as shown in FIG. 4B or 4C. In another embodiment, the knitted insulation may have a raised surface on at least one side of said fabric created by a terry loop and/or brushing, napping or sanding process.

Further embodiments of the textile 10 are illustrated in FIGS. 5A, 5B and 5C. The insulation layers can optionally be formed by a 3D substrate, which has been moulded or extruded in the desired 3D shape, and creates air gaps adjacent to the metal layers. It will be appreciated that the 3D layer is a layer which is substantially non-planar in at least one region. The 3D insulating substrate is preferably formed from of an embossed or moulded non-woven textile. In another embodiment the 3D insulating material is formed from a woven or knitted textile that construed to have a ribbed, ruffled, undulating, textured or seersucker surface.

In yet another embodiment, the 3D layer may be formed by stitch bonding methods. The 3D layer may be formed as a planar substrate which can be metalised prior to being formed as the 3D layer. A stitch bonding process to gather local material can be used to convert the planar substrate, such as substrate 110 with metal layer 120 (radiant barrier 120), to a 3D layer. Elastic threads or other threads stitched in tension may be used in the stitch bonding process to compress the planar substrate in one or more planar directions to gather to material and form a 3D shape. This process may provide for a larger 3D formation or texture to be formed in the material. For example, embossing may achieve undulations or substrate thicknesses in the range of 0.5 to 3 mm, whereas heights of between 5 mm to 20 mm may be achieved by stitch bonding methods. It will also be appreciated that both embossing and subsequent stitch bonding methods may be used to form the 3D layer. It is preferred that metallisation of the substrate occur before 3D layer techniques and methods are applied to form 3D textures or elements.

Figure 5D:
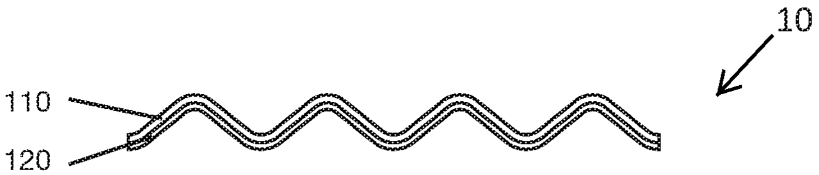
FIG. 5D shows an embodiment of the invention where the metalised substrate is moulded or textured to create a 3D surface creating air gaps adjacent to the metal layer providing an insulating layer.

As shown in FIG. 5D, a substrate 110 has been moulded to form an undulating or textured profile. A metal layer 120 is disposed on substrate 110 and aligns to the contours of the substrate 110. Optionally, an insulation layer 130 can be provided which is formed of a woven or knitted textile that is constructed with a ribbed, ruffled or seersucker texture thereby creating insulating air gaps adjacent to the metal layer. Alternatively, the substrate 110 can be formed of a woven, non-woven or knitted fabric that has been constructed to have a ribbed, ruffled or seersucker texture thereby creating insulating air gaps adjacent to the metal layer. Embossing techniques may be used to impart the desired shape to the substrate. The embossing of the substrate may also impart at least one desired mechanical property to the substrate, such as allowing for elongation or deformation in a predetermined direction. Optionally, a metal layer may be disposed on an insulation layer or a membrane layer. The membrane of the embodiments may be a homogenous membrane or composite membrane, which can comprise one or more layers formed from at least one of; PU, PTFE, PP, PE, or any other conventional membrane materials known in the art.

In an unillustrated embodiment, the textile 10 may be formed, from distal end to proximal end, with the following construction; a woven layer, a non-woven layer, a metal layer, an insulation layer and a further woven layer. The metal layer may be coated onto a scrim layer, and may also be coated with a protective coating, such as a functional coating or abrasion resistant coating. In this embodiment, the woven layer may be substrate 110, the metal layer may be a radiant barrier 120, the insulation may be insulation 130 and the further woven layer may be substrate 140. Optionally, the non-woven layer may be embossed to allow for stretch or deformation in at least one direction.

In yet another unillustrated embodiment, the textile 10 can be formed, from distal end to proximal end, with the following construction; a woven layer, a non-woven layer, a metal layer, an insulation layer, a further metal layer, a further non-woven layer and a further woven layer. Similar to the above embodiment, the woven layers may be similar in construction to that of substrates 110 and 140, the metal layer and further metal layer may be radiant barrier 120. Optionally, the metal layer and further metal layer are deposited onto a scrim layer, and may optionally have a protective coating applied thereto. The non-woven layer may be a scrim layer, made from cotton, flax, synthetic fibres, natural fibres, glass fibres, carbon fibres or any other scrim layer known in the art. The scrim layer can alternatively be a tricot or a low density fabric which may weigh 5 gsm to 50 gsm.

In at least one embodiment, at least one of the substrates of the textile 10 comprises at least one of a moisture vapour permeable non-woven fabric, woven fabric, knitted fabric, moisture vapour permeable film or composites thereof, including nylon, polyester, spandex, polypropylene, cotton, wool, or a mix of these materials.

In another embodiment, at least one textile fabric such as a woven, stretch woven, non-woven, or knitted fabric is applied to the substrate after coating with said organic and metal layers, where the textile is combined with the substrate by process of lamination. Lamination can occur by using an adhesive, thermal film, a melt film, a melt fibre between surfaces or a stitching/needling process.

If the substrate is a woven textile, the woven textile may comprise synthetic warp yarns of between 5 and 250 denier and weft yarns of between 5 and 250 denier that are woven together to create a substantially flat woven textile surface. In yet another embodiment, the substrate is formed with a woven textile may be constructed from nylon or polyester warp yarns of around 10 to 20 denier at a density of around 150 to 250 threads per inch and weft yarns of around 10 to 20 denier at a density of around 150 to 250 threads per inch with an air permeability of between 100 $ft^3$/min to 200 $ft^3$/min Planar or flat surfaces may allow for application of further layers or substrates of the textile 10 to be more tightly applied and therefore the thickness of the final textile can be reduced. At least one substrate of the textile 10 may be a woven textile comprising synthetic warp yarns of between 5 denier to 100 denier and weft yarns of between 5 and 100 denier that are woven together to create a substantially flat woven textile surface. The woven textile may be configured to have an air permeability of between 0.25 $ft^3$/min-200 $ft^3$/min (CFM) as per the American Society for Testing and Materials standard ASTM D 737. Optionally, a substrate of the textile may be calendared before and/or after coating to provide a smooth, level or flush surface for improved heat reflectance.

In another embodiment said textile is compressed through a series of hot rollers in a calendaring process before or after metalisation to produce a more smooth surface to produce a lower emissivity and optimal heat reflectance of said metal layer.

In yet another embodiment, the substrate may be a woven textile constructed from a stretchable elastic yarn such as spandex or other stretchable yarn that is preferably twisted or coiled using methods known in the art with a substantially less stretchable yarn such as polyester.

In another embodiment, the substrate may be a knitted fabric constructed from yarns between 10 and 100 denier using conventional circular knitting, warp knitting or weft knitting methods known in the art. In yet a further embodiment said knitted fabric is knitted on a high gauge knitting machine with a gauge of between 10-20 needles per inch.

Non-woven materials which may be used to form the textile 10 may have a weight of between 5 gsm to 100 gsm and have a thickness of between 30 micron to 200 micron. The thickness of a non-woven material may be modified by printing, crimping, embossing, or heat treating methods. Non-woven materials may be combined with additional outer layer or inner layer textile layers.

In a further embodiment the substrate is formed from a textile fabric such as a woven, stretch woven, non-woven, or knitted fabric that is combined with at least one moisture vapour permeable and substantially liquid impermeable coating and/or film lamination.

In at least one embodiment, at least one of the substrates can comprise one or more textiles combined with a moisture vapour permeable and substantially liquid impermeable film or coating. The moisture vapour permeable and substantially liquid impermeable film or coating may be comprised of a hydrophilic non-porous film or coating, hydrophobic microporous film or coating, hydrophobic nano-fibre film or coating as known in the art or combination thereof. Said moisture vapour permeable and substantially liquid impermeable film or coating is preferably positioned on the surface of the textile 10 so that said film or coating is adjacent to the insulating layer with said metal layer applied to surface of said film or coating adjacent to the insulation layer. In one embodiment an additional scrim layer of highly porous construction is included in the textile and may be positioned on the film or coating layer either between the metal layer and film or coating layer or on top of the metal layer. The scrim layer may be used as the most proximal layer (inner layer) for use in thinner garments. For example, a textile with a scrim layer may comprise a scrim layer, with a substrate and a metal layer positioned between the substrate and scrim layer. In at least one embodiment, the scrim layer is a gauze-like textile which can be made from cotton, flax, synthetic fibres, natural fibres, glass fibres or carbon fibres. The scrim layer can alternatively be a knitted tricot or a low density fabric which may weigh 5 gsm to 50 gsm. The scrim layer may be any scrim layer known in the art. In addition, as $AlO_x$ materials generally have an improved bonding with metals and organics, the bonding with a further protective coating or functional coating may therefore be improved, relative to applying an organic coating to a metal coating which has not been oxidised.

Optionally, the metal layers can be deposited on a substrate by means of vacuum vapour deposition in one or multiple coating layers to achieve the desired thickness of said metal layer to provide optimal reflection of infrared radiation. Said multiple coating layers may be deposited in the same process in a single vacuum chamber or in multiple processes in the same or different vacuum chambers. In some embodiments, the surface of the substrate is treated with plasma prior to the step of vacuum depositing of the metal layer. The vacuum depositing step is performed two or more times in some embodiments to make two or more coatings of metal to achieve a thickness of the metal layer of between about 10 nm and about 200 nm. Multiple metal layers of different materials may be deposited such as a layer of aluminium and a layer of copper, and the two layers may collectively be referred to as a “metal layer” for simplicity. The metal layer may be homogenous and have a uniform structure and thickness. Optionally, portions of the metal layer may have a modified grain structure which can form patterns, or varying reflectance or radiant barrier properties which can be used to direct radiant energy in a desired manner. In another embodiment, an electrolysis process may be used to deposit a metal layer.

Optionally, a primer coating may be applied to a substrate in advance of application of a radiant barrier to the substrate. The primed substrate may provide for a smoother surface for a radiant barrier to be applied thereto, or the primed substrate may be used to improve the bond strength between a radiant barrier and the substrate. Having a smoother substrate may allow for a more uniform application of a radiant barrier, which can improve the functional properties of the radiant barrier in use. Primers may be applied using CVD or PVD techniques depending on the substrate and/or the radiant barrier. Primers may be used to increase or decrease the porosity of the substrate and may also be used to bond or adhere adjacent fibres of the substrate. Any primer used may also be used as a chemical barrier which may assist with waterproofing, breathability or another functional property for the textile. It will be appreciated that any substrate may be primed on one or both sides of the substrate, but will usually be at least the side to be bonded with, or fixed with, a radiant barrier. The radiant barrier may have proximal and distal sides covered with an aluminium oxide ($AlO_x$) layer to assist with protection of the radiant barrier. The aluminium oxide layer may be formed at the time of deposition of the metal layer (radiant barrier) to a substrate or scrim layer by introducing an oxygen species at the deposition interface for a predetermined period of time, and applying a 98%+ pure aluminium deposition to the $AlO_x$ layer. Optionally, oxygen can be introduced to form an oxide layer on at least one of the proximal and distal sides of the metal layer. Causing the aluminium to oxidise during the deposition process can be used to control the oxidation thickness and rate of oxidation. In this way, the radiant barrier may have negligible changes with respect to emissivity values, and thereby providing the advantage of applying a radiant barrier and a protective coating during the same process.

Vacuum deposition methods known in the art are preferred for depositing the metal layer and said deposition methods can also be optionally used to apply protective coating layers.

In another embodiment, a substrate may be coated via vacuum vapour deposition using an additional support substrate to provide stability and ease of handling during said coating process.

According to another embodiment, a metal layer may be produced by means of coating a substrate with a thin metallic film by means of rotary screen printing, block screen printing, transfer printing, jet printing, spraying, sculptured roller or other methods.

In another embodiment, the metal layer is applied to said substrate by means of a transfer metallisation process whereby a thin metal film or foil is coated onto a release substrate such as paper sheet, polypropylene sheet, polyester sheet or other material via vacuum vapour deposition or other method and then adhered onto said substrate.

In a further embodiment, a metal layer may be applied to said substrate in a continuous or discontinuous pattern whereby said metal layer covers an entire surface of the substrate or part of the surface of said substrate. Such a continuous or non-continuous metal layer is typically in the form of a film that is adhered to the surface of the substrate. Although, a stencil may also be used to securely apply a metal layer to a substrate.

The thermal barrier properties of a material can be characterised by its emissivity. Emissivity is the ratio of the power per unit area radiated by a surface to that radiated by a black body at the same temperature. A black body therefore has an emissivity of one and a perfect reflector has an emissivity of zero. The lower the emissivity, the higher the thermal barrier properties. The thickness of the metal and protective coating layers are preferably controlled within ranges that provide a composite substrate having an emissivity no greater about 0.35. For example, insulation layers which may be suitable for use with a textile of the present disclosure may have an emissivity of between 0.3-1.0. In another embodiment, the insulation layer may have an emissivity of between 0.3-0.4 or between 0.05 to 0.5. In yet another embodiment, the insulation layer is approximately 5 mm thick and has an emissivity between 0.5 and 1.

The insulation layers may have a thermal resistance between about 0.05 ($m^2K$)/W and about 0.5 ($m^2K$)/W. The composition and design of the metal layer 120 is varied to obtain a thermal resistance between 0.0 ($m^2K$)/W and about 0.03 ($m^2K$)/W.

Metals suitable for forming the metal layer(s) of the composites of the present invention include aluminium, gold, silver, zinc, tin, lead, copper, titanium and their alloys. The metal alloys can include other metals, so long as the alloy composition provides a low emissivity composite substrate. Each metal layer has a thickness between about 15 nm and 200 nm, or more preferably between about 30 nm and 100 nm, or even more preferably 30 nm to 100 nm In one embodiment, the metal layer comprises aluminium having a thickness between about 15 nm and 150 nm, or between about 30 and 60 nm In other embodiments, the metal layer comprises a silver precipitate with antibacterial properties. If the metal layer is too thin, the desired thermal barrier properties will not be achieved. If the metal layer is too thick, it can crack and flake off and also reduce the moisture vapour permeability of the coated substrate. Generally, it is preferred to use the lowest metal thickness that will provide the desired thermal barrier properties. Preferably, the metal layer is applied to a substrate with less than 10% moisture content. Even more preferably, the moisture content of the substrate is less than 5%. In one example, the moisture of the substrate is less than 2% prior to application of a metal layer. Reducing moisture content may allow for a metal layer to be applied more consistently to a substrate.

In at least one embodiment, an aluminium layer is deposited onto said substrate at a thickness of between 50 nm to 150 nm. In another preferred embodiment, a chromium layer may be deposited on the substrate prior to the deposition of said aluminium layer whereby the Aluminium layer is deposited on top of said chromium layer. In another preferred embodiment an additional chromium layer is deposited on the aluminium layer following deposition of the aluminium layer. Chromium layers have shown to provide improved durability to abrasion and corrosion without significantly increasing the emissivity of said aluminium layers. In another preferred embodiment the metal layer can have increased corrosion resistance by oxidising the surface of a metal layer with an oxygen-containing plasma to form a self-protective metal oxide coating. Further, a controlled level or thickness of oxidation may also be allowed to form on the material to protect the underlying metal layer. Optionally, the metal layer may be coated with a generally transparent protective layer which provides scratch/damage protection while also allowing for the radiant barrier to remain functional.

In another embodiment, the substrate and/or metal layer(s) can feature organic or inorganic coating layer(s) to protect the metal layer from abrasion and corrosion. The thickness and the composition of the protective coating layer preferably does not substantially alter the moisture vapour permeability of the substrate layer and does not significantly increase the emissivity of the metalised substrate. The protective coating layer preferably has a thickness between about 10 nm and 500 nm and is preferably coated uniformly over at least one surface of the substrate and/or metal layer. However, the thickness may be between 10 nm to 100 μm depending on the application process of the protective coating, for example dipping processes may yield a thicker coating layer than other deposition methods. In yet another embodiment, the protective coating is applied with variable thicknesses or is disposed in a discrete array, pattern or texture which may elevate portions of the metal layer above a contact surface the protective coating is likely to be in contact with. In this way, portions of the metal layer can be spaced further from said contact surface to allow for improved radiant protection and may allow for improved breathability. Optionally, $AlO_x$ layers may be disposed adjacent to the metal layer, and may protect the metal layer from abrasion or damage. $AlO_x$ layers may be desirable as protective layers due to the desired bonding strength with a metal layer (radiant barrier), for example, when the metal layer is an aluminium layer. Optionally, the proximal and/or distal sides metal layer (radiant barrier) can be coated or partially covered with at least one $AlO_x$ layer.

In yet another embodiment, the protective coating may be a further metal coating or metal oxide which is deposited, printed or otherwise disposed on a metal layer. It will be appreciated that a single metal layer may have a protective coating, or any number of metal layers may have a protective coating. The protecting coating may be applied to both sides of the metal layer, may be applied to only one side of the metal layer, may be disposed in predetermined regions, may be disposed in an array, may be disposed randomly, may be disposed in any combination of the preceding, or may be disposed in any other predetermined manner.

Optionally, when the metal layers are deposited on the first substrate, the metal layers may have a substantially uniform grain orientation, or may have a biased grain orientation. The grain structure of the metal layers may assist with improving the radiant barrier properties relative to a radiant barrier without a generally uniform or homogenous grain structure deposition. For example, at least 60% of the grains of the grain structure may be relatively parallel or perpendicular to the first substrate said metal layer is applied on. Preferably, the angle of deposition is between 0 to 30 degrees such that the porosity of the metal layer is reduced during the deposition processes. It will be appreciated that depending on the speed and set times of the deposited material, the porosity of the metal layer may be increased or decreased. Applying the evaporation source material at an angle is likely to generate a shadowed region or increase porosity of the metal layer and therefore the amount of material deposited can be reduced while also providing for a desired layer thickness.

In yet another embodiment, the evaporation source may be adapted to move, rotate or otherwise be displaced relative to the first substrate such that a desired angle of deposition may be achieved. For example, rotation of the first substrate or the evaporation source may allow for a helix type deposition layer to be formed which can alter the radiant properties of the metal layer.

In a further embodiment, a template, screen or other stencil may be used to limit deposition locations of the metal layer on the first substrate. Limiting the deposition may provide for regions of improved radiant protection and regions with lesser radiant protection. This may be of particular use when using larger amounts of insulation material, or for use in metal layers with at least one other radiant barrier layer.

Optionally, an organic or inorganic coating layer can be also coated on the surface of the substrate between the substrate layer and the metal coating layer to provide a smoother surface and therefore lower emissivity of the metal layer and/or provide protection against corrosion. Preferably the coating is relatively thin compared to the thickness of the substrate. In another embodiment a thin organic or inorganic layer is coated on both sides of the substrate so that it coats both the first and second surface of said substrate before and/or after the application of the metal layer.

In yet another embodiment, said protective organic or in-organic coating layers are produced by a process if dipping, pad coating, knife coating, spray coating or other coating method known in the art.

In another embodiment, said protective organic or in-organic coating layers are produced by a process of chemical vapour deposition, plasma enhanced chemical vapour deposition, plasma polymerisation, glow discharge deposition or other vapour deposition or vacuum vapour deposition techniques known in the art. In a preferred embodiment the substrate is pre-treated by a cleaning, and/or etching and/or activation step using plasma. The protective layer may be deposited from 2 or more processes whereby a coating is applied on the first surface and then again on the second surface. Alternatively, the protective layer may be applied in a bath or spray such that only a single process is required. In another embodiment the protective coating is applied in a single uniform coating that coats both surfaces of said substrate without significantly reducing the moisture vapour permeability of the substrate.

In a further embodiment, the organic or in-organic coatings are rendered hydrophobic and/or oleophobic by the inclusion of a functional component such as a monomer and/or sol-gel that contains fluorinated functional groups and/or monomers that create a nanostructure on the textile surface. Other hydrophobic and/or oleophobic treatments may also be used which exclude the use of fluorinated functional groups to reduce impact on the environment, these treatment processes will be readily understood by persons of skill in the art.

In a preferred embodiment, the organic or in-organic coatings may also comprise one or more other functional components to provide additional functionality to the composite including: antimicrobial coatings from a monomer and/or sol-gels with antimicrobial functional groups and/or encapsulated antimicrobial agents (including chlorinated aromatic compounds and naturally occurring antimicrobials). Fire retardant coatings from monomers and/or sol-gels with a brominated functional group. Self-cleaning coatings from monomers and/or sol gels that have photo-catalytically active chemicals present (including zinc oxide, titanium dioxide, tungsten dioxide and other metal oxides). Ultraviolet protective coating from monomers and/or sol-gels that contain UV absorbing agents (including highly conjugated organic compounds and metal oxide compounds).

In a preferred embodiment of the present invention, the textile 10 comprises an organic coating material consists of an acrylate and/or methacrylate polymer or oligomer. Vacuum compatible oligomers or low molecular weight polymers include diacrylates, triacrylates and higher molecular weight acrylates functionalised as described above, aliphatic, alicyclic or aromatic oligomers or polymers and fluorinated acrylate oligomers or polymers. Fluorinated acrylates, which exhibit relatively low intermolecular interactions, useful in this invention can have weight average molecular weights up to approximately 6000 g/mol. Preferred acrylates have at least one double bond, and preferably at least two double bonds within the molecule, to provide high-speed polymerisation.

In another embodiment said inorganic coating material consists of components including silicones, organosilanes and metal alkoxides such as titanium, tungsten, zinc. Said inorganic compounds may be deposited via vapour deposition techniques known in the art as previously described. Inorganic coating layer(s) can also be made by the sol-gel process of depositing a partially reacted metal alkoxide onto the substrate in the presence of water and an alcohol. The inorganic or organic layer can also be produced from the deposition of a metal chloride solution.

Preferably, the metal and organic or in-organic coating layers are coated on said substrate using methods that do not substantially reduce the moisture vapour permeability of the substrate. However, if desired the metalised layer may provide for regions of reduced or increased moisture permeability depending on the thickness of the metalised layer and the grain structure of the metalised layer. It will be appreciated that each metal layer on the textile 10 may be deposited in a manner which allows for a desired moisture permeability. Optionally, the metalised layer may be deposited such that voids or gaps in the grain structure of the metal layer may allow for capillary action (capillary motion) or other localised movement of fluids (particularly liquids). This may be of particular advantage of moisture wicking textiles or textiles which require a transfer of fluids to a membrane or other textile substrate.

The voids or gaps in the metalised layer can be formed by the metalisation process parameters. Parameters may include the residence time of the substrate in the vapour deposition chamber (or deposition stage), the speed of the substrate when being metalised, the deposition source, volume of material released from the deposition source, the distance from the deposition source, the bonding times of the vapour source material, the angle of deposition, the movements of the deposition source relative to the substrate to have the metalised layer coated on or deposited on.

In another preferred embodiment, said substrate is pretreated prior to coating in the form of an activation and/or cleaning and/or etching step to improve the adhesion and cross-linking of the polymer coating. Said pre-treatment process can be used to remove residues resulting from the manufacture of textiles which if left on the substrate can reduce the durability of the protective coating and/or metal coating if it bonds to these residues instead of the substrate. Said pre-treatment is preferably achieved by passing the fabric through the plasma zone. Alternatively, the substrate may be pre-treated with ozone.

In another embodiment, said substrate is degassed to reduce the water and/or solvent content before coating said metal layer via vacuum deposition. In a preferred embodiment, said substrate is outgassed by winding the fabric from a first roller to a second roller within a vacuum chamber at least one time. In preferred embodiment said outgassing process takes place within the same vacuum chamber and roll handling system that is used to coat said metal layer and/or said protective layer. In another potential embodiment, said outgassing process is done in a separate chamber. In another preferred embodiment said substrate is degassed by a process including winding said substrate on a heated drum. Said degassing process is preferably undertaken within a vacuum to allow sufficient degassing at a temperature of between 40° C. to 80° C. whereby the lower degassing temperature prevents thermal damage to said substrate. Additional degassing and drying processes maybe also be required at higher temperature to remove other solvents present in said substrate from the manufacturing process.

In yet another embodiment, the textile 10 may undergo more than one metalisation process. The metalisation processes may include vapour deposition, plasma deposition, fluid deposition, or electroplating processes depending on the final application of the textile 10.

Optionally at least one of the metalisation processes deposits the metal in a generally perpendicular direction relative to the substrate, and the at least one further metalisation process deposits the metal at an angle of incidence between 10 to 60 degrees to deposit a metalised layer with a desired porosity. It will be appreciated that the more porous layer may be deposited onto the metal layer formed by the first metalisation process or onto a membrane or a fibre substrate. Increased porosity of the metalised layer may assist with improving the radiant barrier reflectance or may improve the breathability and/or fluid permeability of the textile which is of particular importance for garments.

Between metalisation processes, the temperature and/or moisture of the textile can be changed before applying the subsequent metalised layer for a predetermined deposition property. In this way a desired microstructure or grain structure of at least one of the metal layers can be provided to a substrate. It will be appreciated that while two metalised process can be used to form different portions of the metal layer, the overall metal layers deposited are referred to herein collectively as a metal layer regardless of how many metal layers are deposited from various processes.

In another embodiment, the metal layers may be positioned adjacent to the skin of a user and conduct heat from the wearer to cool the wearer. This may be of particular advantage for convertible clothing in which inner layers of the garment may be installed or removed depending on the temperature. For example, a vest may have an insulation layer adjacent to a radiant barrier for use in lower temperatures, and when the temperature increases the insulation layer may be removed such that the metal layer is adjacent the skin of a wearer to conduct heat from the body of the wearer to cool the wearer. In this way the metal layer is no longer being used as a radiant barrier, but as a thermal conductor.

The textiles 10 may be used to manufacture garments which reduce the thermal signature of a body by 30% to 95% relative to the reduction provided by standard/conventional fatigues or garments. As such, the textiles 10 may have advantageous use in active zones or other military applications. If the metal layers are used for radiant masking the textile metal layer or metal layers generally have a thickness in the range of between 30 nanometres to 500 nanometres. The addition of further radiant barriers may further reduce the thermal signatures of bodies depending on the spacing of the metal layers relative to a radiant source (such as a body) and the thickness and properties of the metal layers as radiant barriers. Optionally, the textile may have a predetermined array of metal disposed on fabric such that only predetermined portions of the garment can release radiant heat. Releasing controlled heat can assist with reducing the temperature of a wearer while also reducing a thermal signature which can be advantageous if detection equipment being used has a limited range or capability. For example, small areas of less than 1 squared inch (1 $In^2$) may be used to allow release of small amounts of thermal energy to keep a wearer cooler while still providing the advantage of thermal signature masking. It will be appreciated that any predetermined area may be used to allow for release of thermal energy from a garment. This is of particular advantage if one side of a wearer will always be facing away from a thermal signature detector as the wear's body will block line of sight to the release of the thermal signature.

Optionally, a high emissivity barrier may be used within a garment which has a low reflective function. For example, graphene may be used within a textile for infrared blocking applications. It will be appreciated that any such high emissivity layer may be disposed near to a face layer (distal layer) of a textile. If a high emissivity layer is used, the high emissivity layer may replace at least one radiant barrier of the textile or be used in addition to any desired radiant barriers.

High emissivity layers may also have applications adjacent to a thermal energy source, such as the skin of a wearer. The high emissivity layer can be used to heat up adjacent layers of the textile or mask the thermal signature of a wearer, at least temporarily. A high emissivity layer such as graphene may be in the range of 10 nm to 100 nm thick and applied in layers. Each layer of graphene may be in the range of 0.01 nm to 5 μm thick, or more preferably in the range of 1 μm to 3 μm thick. Graphene may be applied to a foil substrate or other desired substrate by vapour deposition processes (such as CVD processes). The foil for the graphene layer may be aluminium, gold, titanium, silver, copper, nickel, an alloy of any of the preceding, or any other desired foil. A membrane, such as a polymeric membrane of polyethylene, may be disposed adjacent to the foil or graphene layer to which the graphene may be applied or bonded to. Adhesives may also be used to apply the graphene layer to an adjacent layer or substrate. High emissivity layers may have applications for masking or hiding infrared radiation from a body, and may have uses in military applications or countersurveillance applications for example.

In yet another embodiment, the density of the insulation layer may vary based on either a textured surface of the insulation layer, or may be varied due to compressing portions of the insulation layer to create cavities or gaps. The variable densities of the insulation layer may allow for regions of the insulation layer to allow more or less radiant energy to pass and reach a radiant barrier.

It will be appreciated that any reference to metal layers disposed on a substrate may instead be disposed adjacent to a substrate. Further, it will be appreciated that any metal layer may be disposed on a substrate with a membrane therebetween. In this way moisture may be transferred from one side of the metal layer to the other which can improve breathability of the textile 10.

While specific embodiments are illustrated, it will be appreciated that the substrates/layers of the illustrated embodiments may be reversed or swapped, such that the proximal side and the distal sides are reversed. For example, referring to FIG. 1A substrate 110 may be proximal to the skin and substrate 140 is arranged distally of the substrate 110. Further, the terms "proximal" and distal" are used for reference to more easily describe the order of layers/substrates.

The textile 10 may have a number of uses within the clothing field. Notably, the textiles may have utility for footwear and cold weather clothing. Using the textile 10 in footwear may keep the feet of a wearer drier and therefore increase comfort over longer periods. Further, keeping feet free of moisture may have a number of health benefits and reduce the potential for mould or bacteria to remain in a footwear article. The metal layer may be adapted to also act as a low bioactivity or an oligodynamic region in a footwear and/or clothing article which is particularly useful if clothing or footwear is in frequent use or in environments which are humid or prone to high levels of bacteria/fungus exposure. A low bioactivity region may reduce the growth rate for a fungus or bacteria or substantially prevent the growth of a fungus or bacteria. For example, if an aluminium layer is used as the metal layer, funguses may exhibit a reduced growth rate, and some bacteria may not achieve synthesis. Other metals may also exhibit low bioactivity and also function as a radiant barrier. It will be appreciated that the metal layer may be used to function as a low bioactivity region and not as a radiant barrier.

Including a textile with metal layers within a footwear article may further reduce the overall weight of a footwear article, which is highly desirable for sporting footwear, while also maintaining the integrity and warmth of the footwear article. The textile 10 may reduce the need for lightweight foams to be used in footwear which are typically expensive technologies, while also reducing the weight of footwear further. The metal layer thickness may also impact the breathability of the metal layer, and therefore the metal layer in some applications may be between 10 nm to 200 nm thick which may still allow for sufficient breathability for comfort of a wearer. Alternatively, the metal layer may have regions of higher breathability such that other portions may have an increased metal layer thickness.

In another embodiment, the textile 10 may also be used in combination with organic materials such as wool and be used for manufacturing suits or overcoats. Suits formed with a metal layer may be used to keep a wearer warmer without sacrificing fashionable aspects of a suit as the thickness can be reduced while maintaining a high level of warmth for the wearer. Suits may have a metal layer disposed between the face layer and a lining of a suit. For example, the face layer may be a wool layer with a metal layer disposed between the face layer and a suit lining. The suit lining may be silk, polyester or any other desired material. The metal layer or radiant barrier may be a film which is applied to the face layer or disposed on a flexible substrate between the lining and face layer or the radiant barrier may be applied to the lining. If a radiant barrier is applied to linings, the lining may be a reversable lining. Optionally, the flexible substrate is a permeable substrate which has a desirable breathability to keep the wearer dry and warm. It will be appreciated that lining may not be present, or is removable, such that the suit can be used for different temperature conditions all year round. This versatility of a garment made form the textile may provide for greater use of garments which may have short seasonal use typically.

Figure 8:
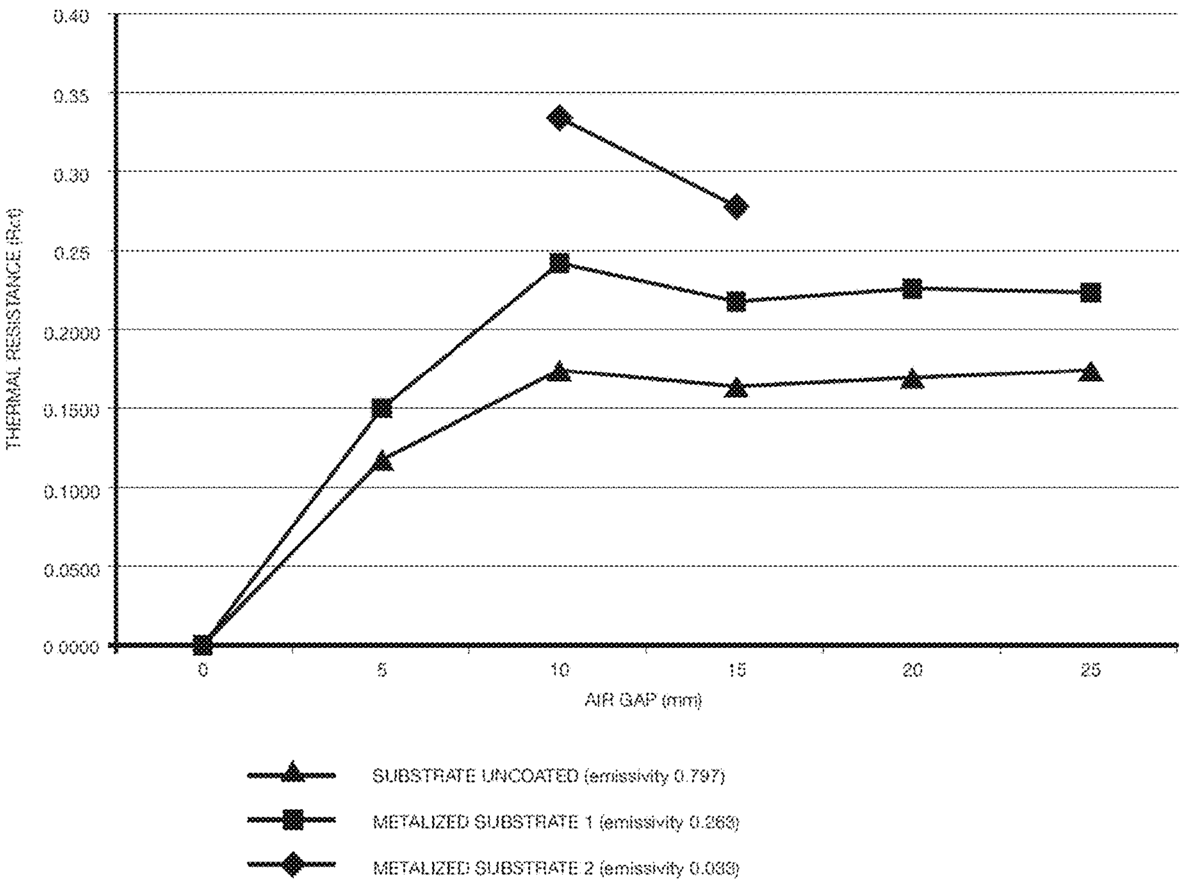
FIG. 8 illustrates an embodiment of a graph of experimental results in accordance with the present disclosure.

Referring to FIG. 8, there is shown a graph of results in relation to thermal resistance (Rct) of a metalised substrate and unmetalised substrate. The graph shows results of a metalised substrate with an emissivity of 0.236 compared with a substrate without metallisation with emissivity 0.797 with at air gap spacings of 0 mm, 5 mm, 10 mm, 15 mm, 20 mm and 25 mm. A substrate provided with an air gap of 0 mm was observed to receive no benefit with the addition of the metallised layer as insulation is not provided to act as a barrier to conduction from the heat source. The results show that the most optimal air gap in relation to thermal resistance is around 10 mm, wherein the 10 mm gap is formed between the metal layer and a further substrate or a heat source. With an air gap of 10 mm with Rct of 0.240 ($m^2K$)/W, which is 36% higher than the substrate with no metallisation. When a substrate 110 with a metallised coating of lower emissivity 0.033 was tested at 10 mm air gap, an improvement in Rct of 0.340 ($m^2K$)/W, around a 90% improvement relative to the substrate with no metallisation.

Figure 9:
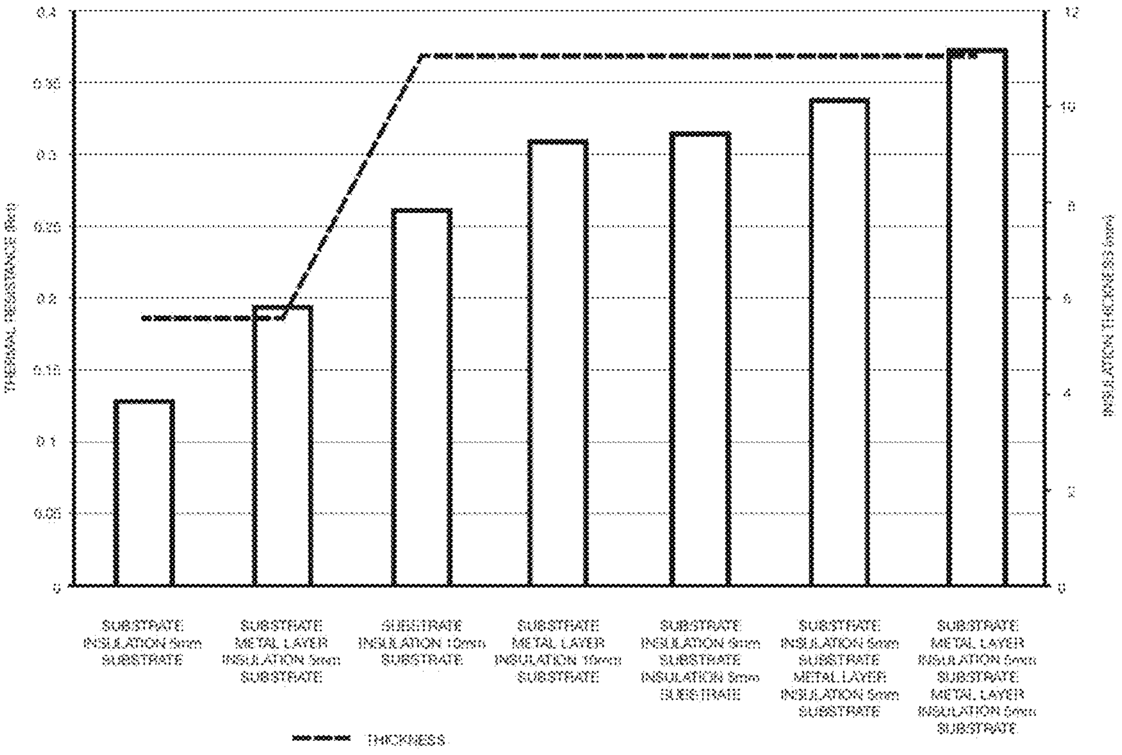
FIG. 9 illustrates another graph of experimental results in accordance with the present disclosure.

FIG. 9 shows the Rct of composite textiles comprising one or more polyester fibre insulation layer and two or more moisture vapour permeable substrates. Metal layers are disposed within selected configurations to illustrate the difference between textiles with and without at least one metal layer.

The first column of the graph shows the Rct for a composite textile with two moisture vapour permeable substrates with a polyester fibre insulation layer with thickness of approximately 5 mm and porosity of approximately 99% disposed between the two said substrates. Each column represents a unique textile 10 construction and will be referred to in the following terms; 'S' represents a 'substrate', 'I' represents an insulation layer, and 'M' represents a 'metal'. As an example, S-I-S, will represent a substrate, insulation layer and further substrate assembled in the order represented by the reference letters.

A thermal resistance measurement of 0.1281 $(m^2K)/W$ was measured for the composite textile with the S-I-S configuration. The next column shows the results of the inclusion of a metal layer (S-M-I-S) disposed on one of the substrates, which resulted in a thermal resistance (Rct) measurement of 0.1926 $(m^2K)/W$, which is an improvement of around 50% relative to the S-I-S composite.

When the insulation thickness was increased to around 10 mm, the measured Rct was 0.2603 $(m^2K)/W$ for the S-I-S composite textile 10 and the Rct measured for the composite with the metal layer (S-M-I-S) was 0.3074 $(m^2K)/W$, which is an increase in thermal resistance of 18% relative to the S-I-S composite without the metal layer.

Turning to the composite textile 10 with a construction of S-I-S-I-S, in which the I layers have a 5 mm thickness, the overall thermal resistances measured were improved relative to the S-I-S configuration with the I layer having a 10 mm thickness. When additional insulation layers and/or substrate layers and/or metal layers are added, further increases in thermal resistance were observed. When an additional moisture permeable substrate layers were positioned between two 5 mm insulation layers, the Rct measured was 0.3130 $(m^2K)/W$, an increase in thermal resistance of around 20% compared to the composite having the S-I-S configuration. Referring to the configuration S-I-S-M-I-S, wherein the metal is on the surface closer to the heat source, the Rct measured was 0.336 $(m^2K)/W$. When both middle and outer substrates were metalised (S-M-I-S-M-I-S configuration) the Rct measured was 0.3715 $(m^2K)/W$ which is an improvement of thermal resistance of 42% compared to the S-I-S configuration with 10 mm I layer, and 190% compared to the S-I-S composite with 5 mm I layer.

In at least one embodiment, the insulation comprises synthetic fibres about 5 micron to about 50 micron in diameter, and can comprise of fibres that are all the same diameter or varying diameters. In yet a further embodiment, the insulation layer may comprise natural feather or natural down disposed between two substrates, whereby said two substrates are of a knitted woven, non-woven or film that is able to resist the migration of said feathers through the substrates. Said insulation layers can be combined with any predetermined substrates by lamination processes using an adhesive, high frequency weld, or a melt film, or a melt fibre between surfaces or a stitching/needling process.

While specific reference to substrate 110 has been made throughout this specification with respect to application of coatings and treatments, it will be appreciated that substrates 140, 240, and 270 may have similar coatings and treatments applied thereto if desired. For example, each of these substrates may be metalised, coated, treated, embossed, perforated, cut, undulated or otherwise have similar or the same treatments and coatings applied thereto. It will also be appreciated that each of substrates 110, 140, 240 and 270 may be formed from the same materials or different materials and/or different construction methods. For example, substrate 110 may be a non-woven substrate, substrate 140 may be a woven substrate, substrate 240 may be a knitted substrate, and substrate 270 may be a combination of woven and non-woven materials; and each may still be treated with the same coating and/or treatments if desired.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A textile assembly with a radiant barrier, the textile assembly comprising;

a proximal side and a distal side;

a first substrate layer and a second substrate layer;

the first substrate being disposed distally of the second substrate;

an insulation layer disposed adjacent to the second substrate;

at least one of the first substrate layer and the second substrate layer is a radiant barrier, and wherein the radiant barrier has an average thickness of between 20 nm to 150 nm;

a third substrate layer distal the first substrate layer and said third substrate layer having relatively larger pores than the first substrate layer, in which the first substrate layer and third substrate layer are moisture vapour permeable; and wherein fibre spacing of the insulation layer allows for infrared transparency between a proximal side of the insulation layer and the distal side of the insulation layer, and said fibre spacing of the insulation layer, when uncompressed in the assembly, has a uniform thickness and predetermined spacing range such that it limits the actual contact with the surface area of the second substrate layer to less than 20%, and wherein the volume of fibre to the volume of air of the insulation layer is in the range of between 1:30 to 1:1000.

2. The textile assembly of claim 1, wherein the second substrate layer is the radiant barrier and the first substrate is a woven or non-woven material.

3. The textile assembly of claim 1 wherein the second substrate layer covers between 60% to 100% of a surface of the first substrate layer.

4. The textile assembly of claim 1, wherein at least one of the first substrate layer and the second substrate layer has a desired shape formed by at least one of; moulding, stamping, heat treatment, ultrasonic welding and embossing.

5. The textile assembly of claim 1, wherein the insulation layer has a desired shape formed by at least one of; moulding, stamping, heat treatment, ultrasonic welding and embossing.

6. The textile assembly of claim 5, wherein the desired shape is formed by at least one of a reinforcement structure and ribbing elements.

7. The textile assembly of claim 1, wherein the insulation is formed with variable densities.

8. The textile assembly of claim 1, wherein a third substrate layer is disposed proximally of the insulation layer.

9. The textile assembly of claim 8, wherein the third substrate layer has a further radiant barrier disposed thereon, and the insulation layer is adjacent the further radiant barrier.

10. The textile assembly of claim 1, wherein the distal side of the first substrate layer has a at least one of a radiant barrier and an insulation layer disposed thereon.

11. The textile assembly of claim 1, wherein the insulation layer is in contact with less than 20% of the surface area of the first substrate layer.

12. The textile assembly of claim 1, wherein the thickness of the first substrate layer is at least 500 times greater than the thickness of the second substrate layer.

13. The textile assembly of claim 1, wherein the second substrate layer is deposited on the first substrate layer by vapour deposition.

14. The textile assembly of claim 1, wherein the density of the fibre allows for an infrared transparency of at least 5%.

15. The textile assembly of claim 1, wherein the assembly reduces a thermal signature of a body by 30% to 95%.

16. The textile assembly of claim 1, wherein the radiant barrier is the second substrate layer and the porosity of the radiant barrier is in the range of equal to the porosity of the first substrate layer to more porous relative to the first substrate layer.

17. A textile assembly comprising;

an inner substrate and an insulation layer disposed distally of the inner substrate;

a radiant barrier disposed distally of the insulation layer;

a further substrate disposed distally of the radiant barrier, in which the radiant barrier is fixed thereto;

an intermediate substrate disposed between the radiant barrier and the further substrate, in which the further substrate has a relatively higher porosity than the intermediate substrate;

the intermediate substrate and further substrate are moisture vapour permeable;

a coating on the distal side of the further substrate; and wherein fibre spacing of the insulation layer allows for infrared transparency between a proximal side of the insulation layer and the distal side of the insulation layer, in which less than 20% of the radiant barrier is in contact with the insulation layer as a result of the fibre spacing, wherein the fibre spacing, when uncompressed in the assembly, has a uniform thickness and predetermined spacing range such that it limits said contact of the insulation layer with the radiant barrier, and wherein the volume of fibre to the volume of air of the insulation layer is in the range of between 1:30 to 1:1000.

18. A textile assembly comprising;

a first substrate and a second substrate arranged proximally of the first substrate;

the first substrate being plastically deformed to impart a texture on said substrate and the second substrate being shaped to conform to the first substrate;

a third substrate disposed distal the first substrate layer and said third substrate having relatively larger pores than the first substrate, in which the first substrate and third substrate layer are moisture vapour permeable; and wherein third substrate and the second substrate are coated with a protective coating, and the second substrate is a metal substrate and the third substrate is a flexible substrate, the third substrate being selected from the following group of; a woven material, a non-woven material, a knitted material, synthetic fibres, natural fibres, knitted fabrics, woven fabrics, non-woven fabrics, and composites thereof, and wherein the volume of fibre to the volume of air of the first substrate is in the range of between 1:30 to 1:1000, and wherein fibre spacing of the first substrate, when uncompressed in the assembly, has a uniform thickness and predetermined fibre spacing range such that it limits the contact between the first substrate and the second substrate.

19. The textile assembly as claimed in claim 18, wherein the second substrate is deposited on the first substrate by vapor deposition.

20. The textile assembly as claimed in claim 18, wherein a membrane is disposed between the first substrate and the second substrate.

* * * * *